United States Patent
Dow et al.

(10) Patent No.: US 8,919,088 B2
(45) Date of Patent: Dec. 30, 2014

(54) SELF-PROPELLED WINDROW MERGER

(75) Inventors: Paul W. Dow, Byron, NY (US); Steven S. Dow, Byron, NY (US)

(73) Assignee: Oxbo International Corporation, Byron, NY (US)

( * ) Notice: Subject to any disclaimer, the term of this patent is extended or adjusted under 35 U.S.C. 154(b) by 0 days.

(21) Appl. No.: 13/342,820

(22) Filed: Jan. 3, 2012

(65) Prior Publication Data

US 2013/0014481 A1 Jan. 17, 2013

Related U.S. Application Data

(60) Provisional application No. 61/429,403, filed on Jan. 3, 2011.

(51) Int. Cl.
| | | |
|---|---|---|
| *A01D 43/00* | (2006.01) | |
| *A01D 57/00* | (2006.01) | |
| *A01D 84/00* | (2006.01) | |
| *A01B 73/00* | (2006.01) | |
| *A01D 57/20* | (2006.01) | |
| *A01D 41/12* | (2006.01) | |

(52) U.S. Cl.
CPC ............... *A01B 73/00* (2013.01); *A01D 84/00* (2013.01); *A01D 57/20* (2013.01); *A01D 41/1261* (2013.01)
USPC ......................................................... 56/192

(58) Field of Classification Search
USPC ........ 56/192, 228, 14.9, 15.8, 15.2, 134, 370; 296/190.04, 190.05; 182/97, 106, 127
See application file for complete search history.

(56) References Cited

U.S. PATENT DOCUMENTS

| | | | |
|---|---|---|---|
| 1,877,519 A | | 9/1932 | MacGregor |
| 1,877,770 A | | 9/1932 | Larson |
| 2,168,266 A | | 8/1939 | McElwain |
| 2,195,381 A | | 3/1940 | Patterson |
| 2,343,583 A | | 3/1944 | Rogers |
| 2,967,584 A | * | 1/1961 | Westerlund ..................... 182/97 |
| 3,177,638 A | * | 4/1965 | Johnson .............................. 56/7 |
| 3,190,392 A | * | 6/1965 | Ashton et al. ................... 182/97 |
| 3,214,002 A | | 10/1965 | Kirkpatrick et al. |

(Continued)

FOREIGN PATENT DOCUMENTS

| | | |
|---|---|---|
| DE | 90 14 438.4 | 3/1991 |
| DE | 43 28 351 A1 | 3/1995 |

(Continued)

OTHER PUBLICATIONS

International Search Report and Written Opinion mailed Aug. 24, 2012.

(Continued)

*Primary Examiner* — Árpád Fábián-Kovács
(74) *Attorney, Agent, or Firm* — Merchant & Gould PC

(57) ABSTRACT

A self-propelled windrow merger includes a motor and a chassis. At the front of the merger are a first pickup and transfer assembly, a second pickup and transfer assembly and a third pickup and transfer assembly. A cab is above and behind the second pickup and transfer assembly. A folding mechanism for moves each of the pickup and transfer assemblies between a first position wherein the first, second and third pickup and transfer assemblies are laterally aligned and a second position wherein the first and third pickup and transfer assemblies are positioned rear of the cab.

18 Claims, 21 Drawing Sheets

(56) References Cited

U.S. PATENT DOCUMENTS

| | | | | |
|---|---|---|---|---|
| 3,240,005 | A | 3/1966 | Rowse | |
| 3,508,627 | A * | 4/1970 | McCallum et al. | 182/97 |
| 3,515,408 | A | 6/1970 | Cagle | |
| 3,650,096 | A | 3/1972 | Caldwell | |
| 3,656,578 | A * | 4/1972 | Hemken | 182/20 |
| 3,695,015 | A | 10/1972 | Twidale et al. | |
| 3,709,360 | A | 1/1973 | Baker | |
| 3,714,766 | A | 2/1973 | Ender et al. | |
| 3,897,832 | A | 8/1975 | Leedahl et al. | |
| 4,042,044 | A | 8/1977 | Honnold | |
| 4,058,170 | A | 11/1977 | Ankenman et al. | |
| 4,131,293 | A * | 12/1978 | Kindle | 280/166 |
| 4,184,314 | A | 1/1980 | Hobbs | |
| 4,232,747 | A | 11/1980 | Pfenninger et al. | |
| 4,245,716 | A * | 1/1981 | Rayfield | 182/86 |
| 4,346,909 | A | 8/1982 | Hundeby | |
| 4,409,780 | A | 10/1983 | Beougher et al. | |
| 4,487,004 | A | 12/1984 | Kejr | |
| 4,621,487 | A | 11/1986 | Urlacher | |
| 4,658,572 | A | 4/1987 | Honey et al. | |
| 4,738,092 | A | 4/1988 | Jennings | |
| 4,768,334 | A | 9/1988 | Honey et al. | |
| 4,793,129 | A | 12/1988 | Ehrhart et al. | |
| 4,840,020 | A | 6/1989 | Oka | |
| 4,896,732 | A | 1/1990 | Stark | |
| 4,910,951 | A | 3/1990 | Reilly et al. | |
| 4,981,013 | A | 1/1991 | Underwood | |
| 5,031,394 | A | 7/1991 | Honey | |
| 5,111,636 | A | 5/1992 | Quirin | |
| 5,155,986 | A | 10/1992 | Kelderman | |
| 5,177,944 | A | 1/1993 | Finlay | |
| 5,203,154 | A | 4/1993 | Lesher et al. | |
| 5,507,139 | A | 4/1996 | Delperdang et al. | |
| 5,813,494 | A * | 9/1998 | Ulschmid et al. | 182/97 |
| 5,893,262 | A | 4/1999 | Harbach | |
| 5,911,625 | A | 6/1999 | von Allworden | |
| 5,956,934 | A | 9/1999 | Wright et al. | |
| 5,964,077 | A | 10/1999 | Guinn | |
| 6,205,757 | B1 | 3/2001 | Dow et al. | |
| 6,212,865 | B1 | 4/2001 | Peeters et al. | |
| 6,347,686 | B1 * | 2/2002 | Hedley et al. | 182/86 |
| 6,401,440 | B1 | 6/2002 | Franet et al. | |
| 6,658,828 | B2 | 12/2003 | Franet | |
| 6,688,093 | B1 * | 2/2004 | Franet et al. | 56/228 |
| 6,758,031 | B2 | 7/2004 | Franet et al. | |
| 6,862,873 | B2 | 3/2005 | Franet | |
| 6,942,041 | B1 | 9/2005 | Kraus et al. | |
| 7,310,929 | B2 | 12/2007 | Dow et al. | |
| 7,543,433 | B2 * | 6/2009 | Hironimus | 56/159 |
| 7,650,736 | B1 | 1/2010 | Salley et al. | |
| 7,712,295 | B2 * | 5/2010 | Walter et al. | 56/228 |
| 7,827,774 | B2 | 11/2010 | Dow et al. | |
| 8,074,432 | B2 * | 12/2011 | Hironimus et al. | 56/6 |
| 8,091,331 | B2 | 1/2012 | Dow et al. | |
| 8,186,138 | B2 * | 5/2012 | Dow et al. | 56/192 |
| 8,225,588 | B2 * | 7/2012 | Hironimus et al. | 56/15.8 |
| 8,511,052 | B2 * | 8/2013 | Dow et al. | 56/364 |
| 2005/0126153 | A1 | 6/2005 | Hironimus et al. | |
| 2005/0172598 | A1 | 8/2005 | Billard | |
| 2006/0162308 | A1 | 7/2006 | Dow et al. | |
| 2006/0248870 | A1 | 11/2006 | Geiser | |
| 2006/0254238 | A1 * | 11/2006 | Walter et al. | 56/15.2 |
| 2006/0254240 | A1 | 11/2006 | Krone et al. | |
| 2006/0254244 | A1 * | 11/2006 | Geiser | 56/370 |
| 2009/0241503 | A1 | 10/2009 | Babler et al. | |
| 2009/0320434 | A1 | 12/2009 | Pourchet et al. | |
| 2010/0037584 | A1 | 2/2010 | Dow et al. | |

FOREIGN PATENT DOCUMENTS

| | | |
|---|---|---|
| DE | 43 41 610 | 8/1995 |
| DE | 10 2006 059797 | 6/2008 |
| EP | 0 827 684 A2 | 11/1998 |
| EP | 0 853 872 | 3/2003 |
| FR | 2 663 189 A1 | 12/1991 |
| GB | 2 194 422 A | 3/1998 |
| SU | 835359 | 6/1981 |
| WO | WO 87/06793 | 11/1987 |

OTHER PUBLICATIONS

"Snel schud-/harksysteem", 1 page (dated Jul. 21, 2000); with English translation, 2 pages.
European Search Report dated Apr. 11, 2014.

* cited by examiner

SELF-PROPELLED WINDROW MERGER

BACKGROUND OF THE INVENTION

1. Field of the Invention

The present invention relates to a self-propelled windrow merger apparatus and a method of merging windrows. In particular, the present invention relates to a self-propelled windrow merging apparatus and method having more than two head and conveyor assemblies that form a continuous path in use and retract for transport.

2. Description of the Prior Art

Devices for merging windrows are well known and are used to gather material, such as cut hay that might be windrowed, and merge it into a single windrow for harvesting or baling. Such windrow mergers typically included a single pickup head to move the material to a single row at one side of the merger. When used on a relatively small scale, these devices generally function in a satisfactory manner. However, for large scale operations requiring merging on large fields, the capacity of such mergers is limited because of their width and may not be sufficient to merge the material at an adequate rate for subsequent pickup by other devices. The merging must often be performed during a small timeframe when conditions are favorable so that the need exists for a merger with greater merging capacity so as not to slow the harvest process. A limiting factor for the size of the merger device has been the towing capacity and availability of tractors and other propulsion devices and the width of the merger devices during transport. The machines must be transported from field to field and must be able to accomplish entry and exit in and out of fields, as well as meeting width limitations for transport on public highways and other roads without removing the heads.

In order to achieve a wider merger apparatus, folding mergers have been developed, such as shown in U.S. Pat. No. 6,205,757 to Dow et al The Dow et al. '757 patent has a two headed merger device that folds to a storage position for transport. In addition, the Dow device utilizes transverse conveyors to move materially laterally and provide various configurations for moving material to the desired windrow. The Dow et al. '757 patent teaches a device that is successful in providing higher capacity, greater width, and improved methods of merging while folding to a storage position for transport. However, further improvements to windrow mergers are possible.

Utilizing wider folding heads provides design challenges, especially achieving a linkage for folding wide heads and providing acceptable support, while limiting the loads and torque in operating positions, storage positions and during movement between the use position and the transport position. In order to achieve higher capacity, the heads may be widened, but the design becomes more complicated and difficult due to moving wider heads and staying within height and width limitations when folded. Controls and mechanisms for folding more than two heads are not contemplated in the prior art.

Moreover, another problem that devices having multiple heads suffer from is that they typically form a gap between the ends of adjacent pickup heads so that some material may be missed in the field as the merger advances. Motors and other drive equipment have typically been positioned at ends of heads, providing an obstruction between the ends of the heads, requiring a gap between the end rows of tines adjacent the heads. Operating prior adjustable conveyors at a sufficient rate so that material is passed from one conveyor to the other has required spacing that allows for adjustment, which prohibits an unobstructed pickup face without gaps. Achieving a conveyor that does not require adjustable end rollers would improve the liability and eliminate constant adjustment for different configurations. If such manual adjustment is not required, control of the merger apparatus and changing between different operating configurations, or changing between storage and use positions could be accomplished remotely by an operator of the towing vehicle without having to manually adjust conveyor heads and other equipment. The utility of such a merger apparatus is increased if such changes and configurations may be made during merging without having to stop.

For some applications, a tractor is not available to tow the larger mergers, especially during the short windows available during harvest when the tractor may be needed for other tasks. In addition, tow behind mergers require the operator to be driving a tractor while monitoring the merging operation behind the tractor. Operations are easier if the merger heads are in front of the operator in use. Moreover, a self-propelled merger has greater utility if the heads can be retracted to a narrower configuration for transport and with the end heads behind the cab during transport so as not to create a large blind spot. A tractor and coupled merger combination may be difficult to maneuver in corners or smaller spaces or when entering or leaving fields.

It can be seen that a new and improved self-propelled windrow merging apparatus is needed. A self-propelled merger should have a pickup face in front of the operator so that the operator may look forward and view the heads picking up material. Such a merger should provide for a wider effective pickup face that can accommodate various spacing of windrows and material and an unobstructed pickup face so that material is not missed in the field. Such a merger apparatus should provide for a merger having more than two heads and allow for folding of the heads between a use position and a retracted transport position, allowing for transport on public roads. A merger should utilize a simple pivot arm to move the pickup and conveyor assemblies between a use position and retracted position. The present invention addresses these as well as other problems associated with windrow merging devices and merging operations.

SUMMARY OF THE INVENTION

A self-propelled merger includes a motor, a chassis and first, second and third aligned pickup and transfer assemblies. Each of the pickup and transfer assemblies being movable between a first position wherein the pickup and transfer assemblies are laterally aligned and a second position retracted for transport. A cab is above and slightly behind the center pickup and transfer assembly and provides the operator with a clear view of the pickup and transfer assemblies as the merger advances. A folding mechanism moves each of the pickup and transfer assemblies between the first position and the second position. Each of the pickup and transfer assemblies includes a pickup head, a conveyor and a shroud. The shroud retracts for moving to the transport position and at the transport position.

A ladder assembly moves between a first position for use and a second position to allow the first pickup and transfer assembly to move back and forth between the first position and the second position. The outer pickup and transfer assemblies retract to positions with the chassis located intermediate the left pickup and transfer assembly and the right pickup and transfer assembly.

The outer pickup and transfer assemblies extend substantially along a direction of travel in the transport position and are oriented with surfaces of the conveyors facing horizontally in the second position. Each of the outer pickup assemblies is supported on an arm extending substantially horizontally and bending downward that pivots about a single axis on a pin on the chassis. The pin extends inward and upward. The center pickup and transfer assembly tilts to the rear for transport.

These features of novelty and various other advantages that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

Referring now to the drawings, wherein like reference numerals and letters indicate corresponding structure throughout the several views.

DETAILED DESCRIPTION OF THE PREFERRED EMBODIMENT

Figure 1:
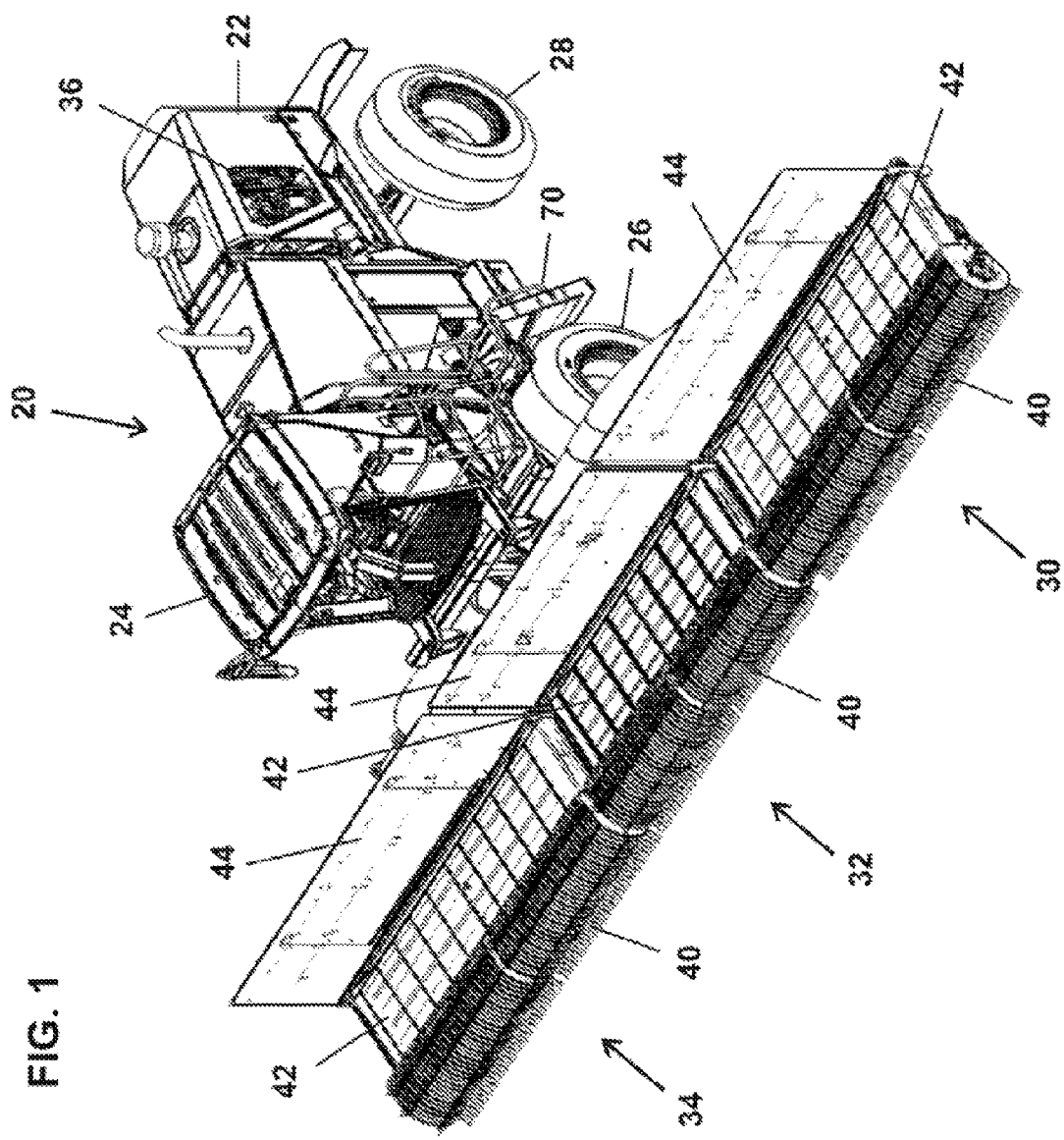
FIG. 1 is a perspective view of a self-propelled merger apparatus according to the principles of the present invention.
Figure 2:
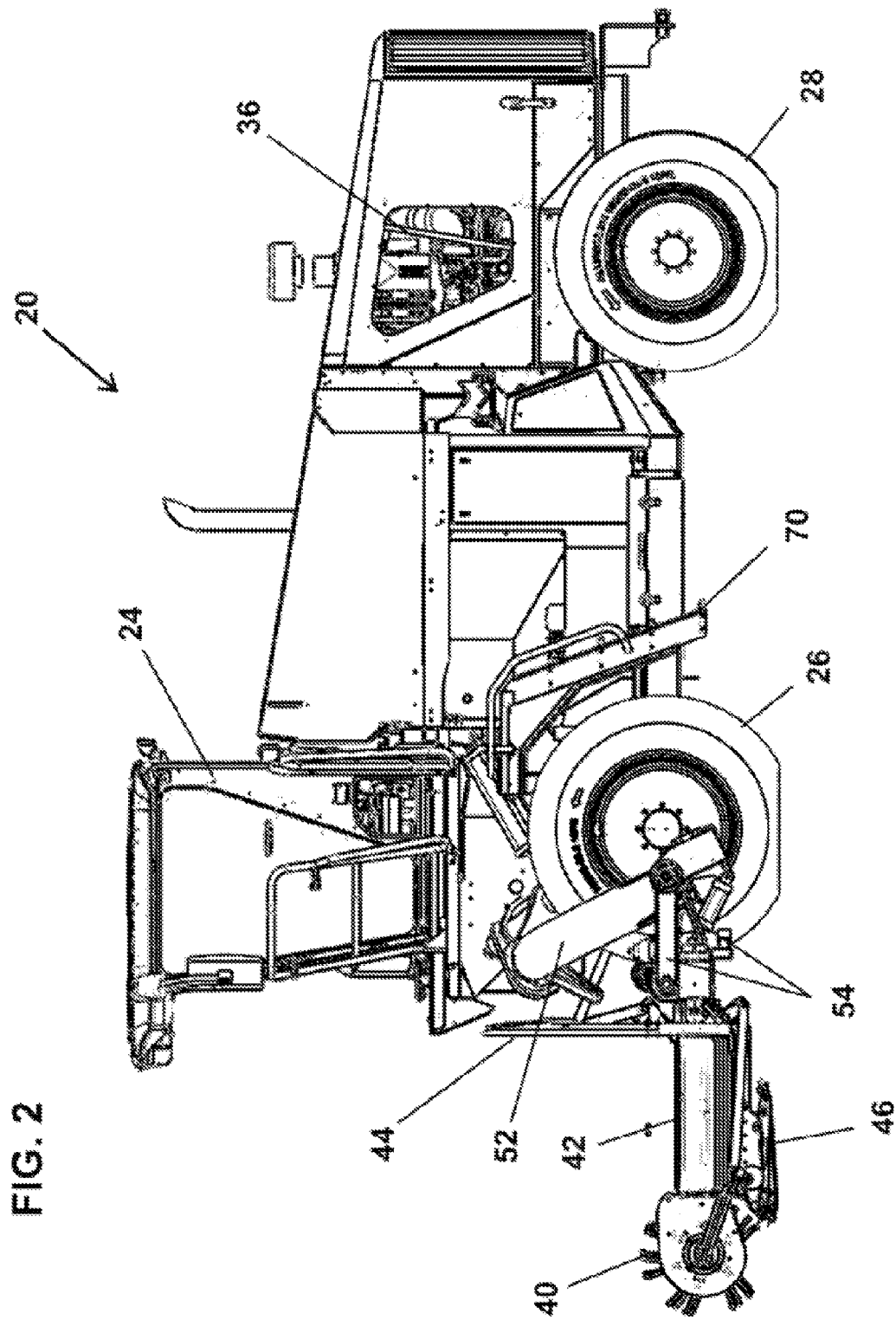
FIG. 2 is a right side perspective view of the self-propelled merger apparatus shown in FIG. 1.
Figure 3:
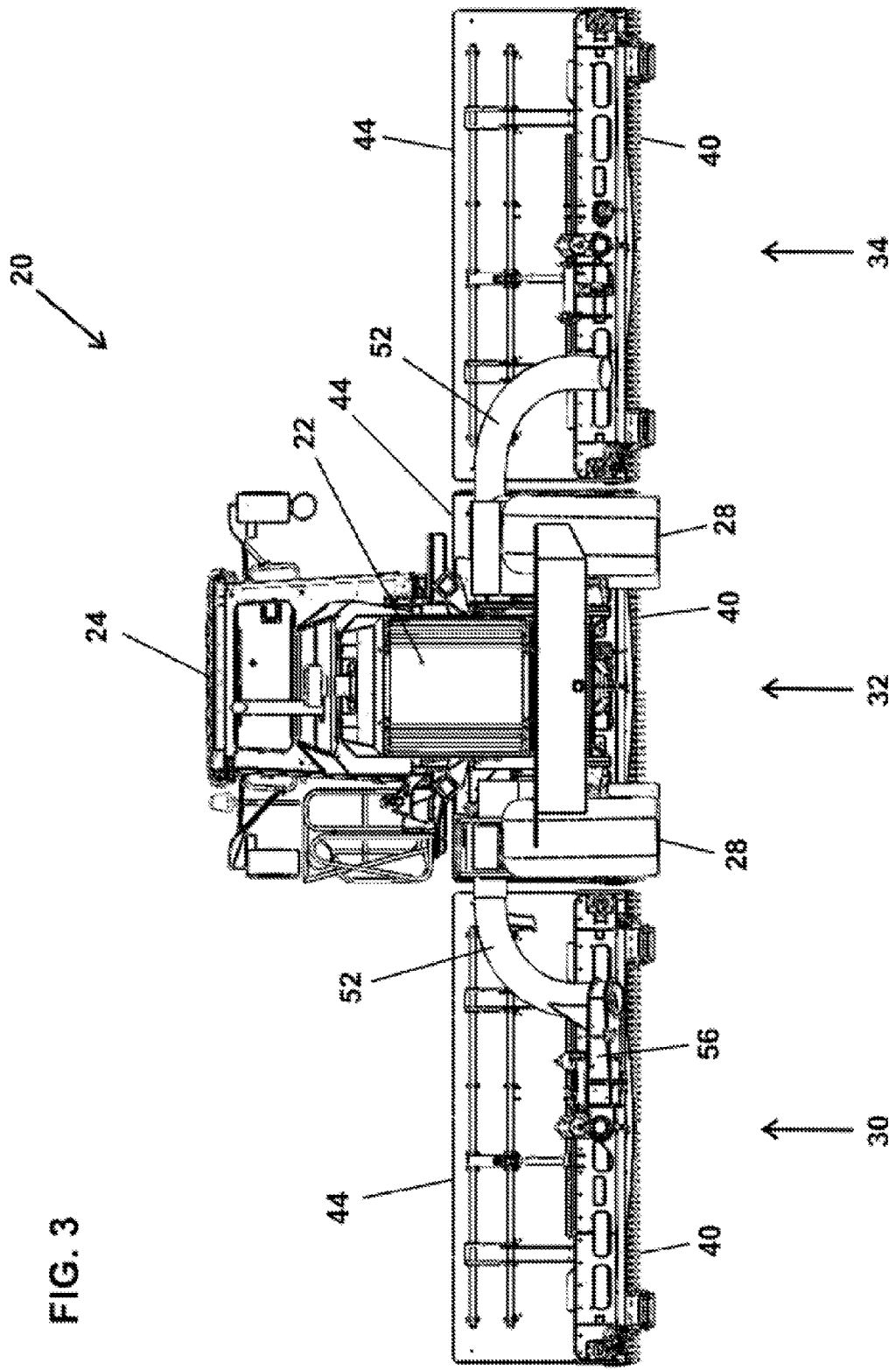
FIG. 3 is a rear elevational view of the self-propelled merger apparatus shown in FIG. 1.

Referring now to the drawings and in particular to FIGS. 1-3, there is shown a self-propelled merger apparatus, generally designated 20. The merger apparatus 20 includes a chassis 22 extending rearward from an operator cab 24. The cab 24 includes a steering wheel and other controls for driving the self-propelled merger 20 and operating the pickup and transfer assemblies 30, 32 and 34. In the embodiment shown, the merger chassis 22 is supported on four wheels including front wheels 26 and rear wheels 28. The merger 20 includes rear wheel steering although other configurations are also foreseen. The merger 20 is powered by a motor 36 placed at the rear of the chassis 22.

The pickup and transfer assemblies 30, 32 and 34 form a continuous lateral transport path at the front of the merger 20. The lateral transport path provides for merging hay into windrows. Each of the pickup and transfer assemblies includes a head 40 including rows of tines rotating between flexible guards. The cab 24 is aligned above the second pickup and transfer assembly. The cab 24 is positioned so that the lateral transport path is in front of the operator when merging. The operator is therefore able to look forward while steering and monitoring the pickup and transfer assemblies 30, 32 and 34. The tines pick up cut hay from the field and direct it rearward onto the conveyors 42. A rear shroud 44 ensures that if hay is thrown too far rearward, it falls onto an associated conveyor 42. Floats 46 provide for maintaining each of the heads at a proper position for picking up the cut hay from the ground. The heads and conveyors are powered by hydraulic motors, not shown, receiving hydraulic fluid powered through lines from the motor 36. Each of the pickup and transfer assemblies mounts on pivoting assemblies 54 and the outer pickup and transfer assemblies 30 and 34 are supported on curved arms 52 that pivot and retract the heads, as explained hereinafter. Such linkages and floats are known in the art and shown in U.S. Published Application 2010037584, published Feb. 18, 2010 and incorporated herein by reference. As shown more clearly in FIGS. 2 and 3, the arms 52 extend outward and then bend downward to provide for moving the pickup and transfer assemblies between the use position shown in FIGS. 1-3 and a retracted position for transport, shown in FIGS. 7-9.

It can be appreciated that the self-propelled merger 20 provides for picking up a swath of cut hay of up to approximately 10 or 12 meters for example, depending on the width of the pickup and transfer assemblies. Moreover, the outer pickup and transfer assemblies 30 and 34 fold to a position extending substantially rearward for transport so that in the configuration shown in FIGS. 7-9, the merger 20 has a width of under three meters and may be used on public roads. Moreover, the outer heads 30 and 34 are retracted to a position wherein they provide little obstruction of the operator's view.

The movement from the use to the retracted position is accomplished with the arms 52 rotating about a single axis about an angled pivot pin 50, shown in FIGS. 15-18.

Figure 4:
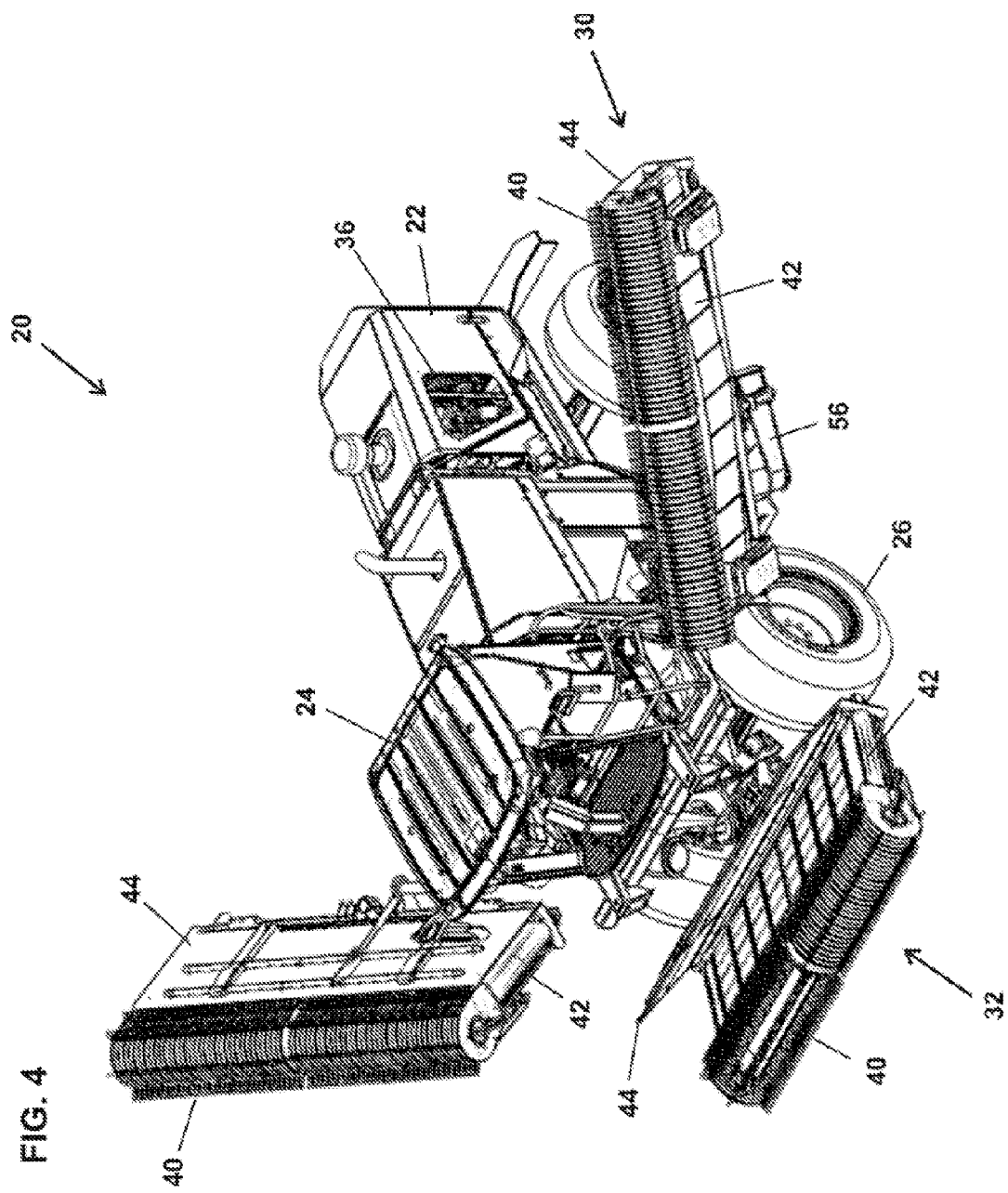
FIG. 4 is a perspective view of the self-propelled merger apparatus shown in FIG. 1 with the head assemblies in an intermediate position.
Figure 5:
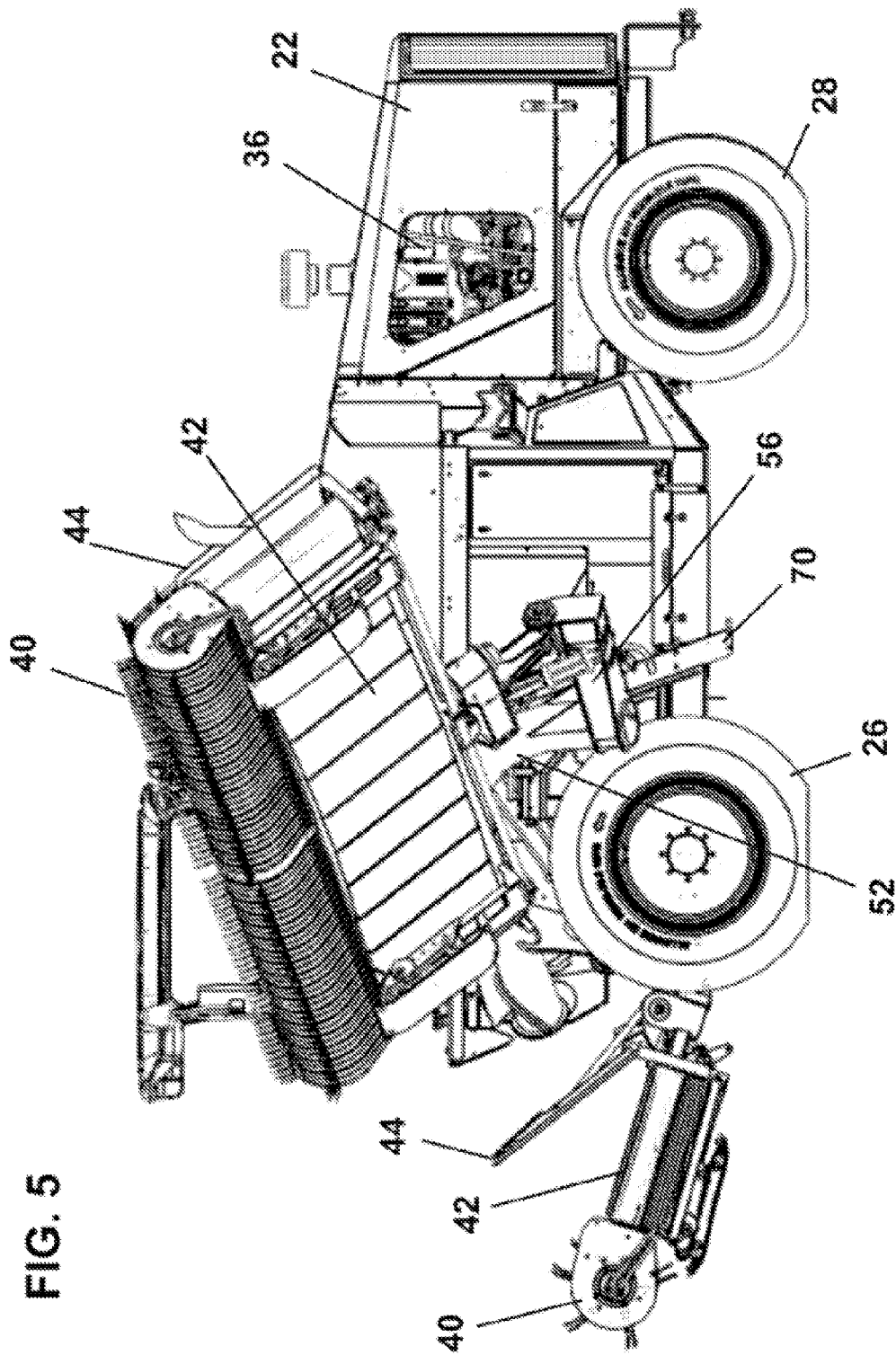
FIG. 5 is a right side perspective view of the self-propelled merger apparatus shown in FIG. 4.
Figure 6:
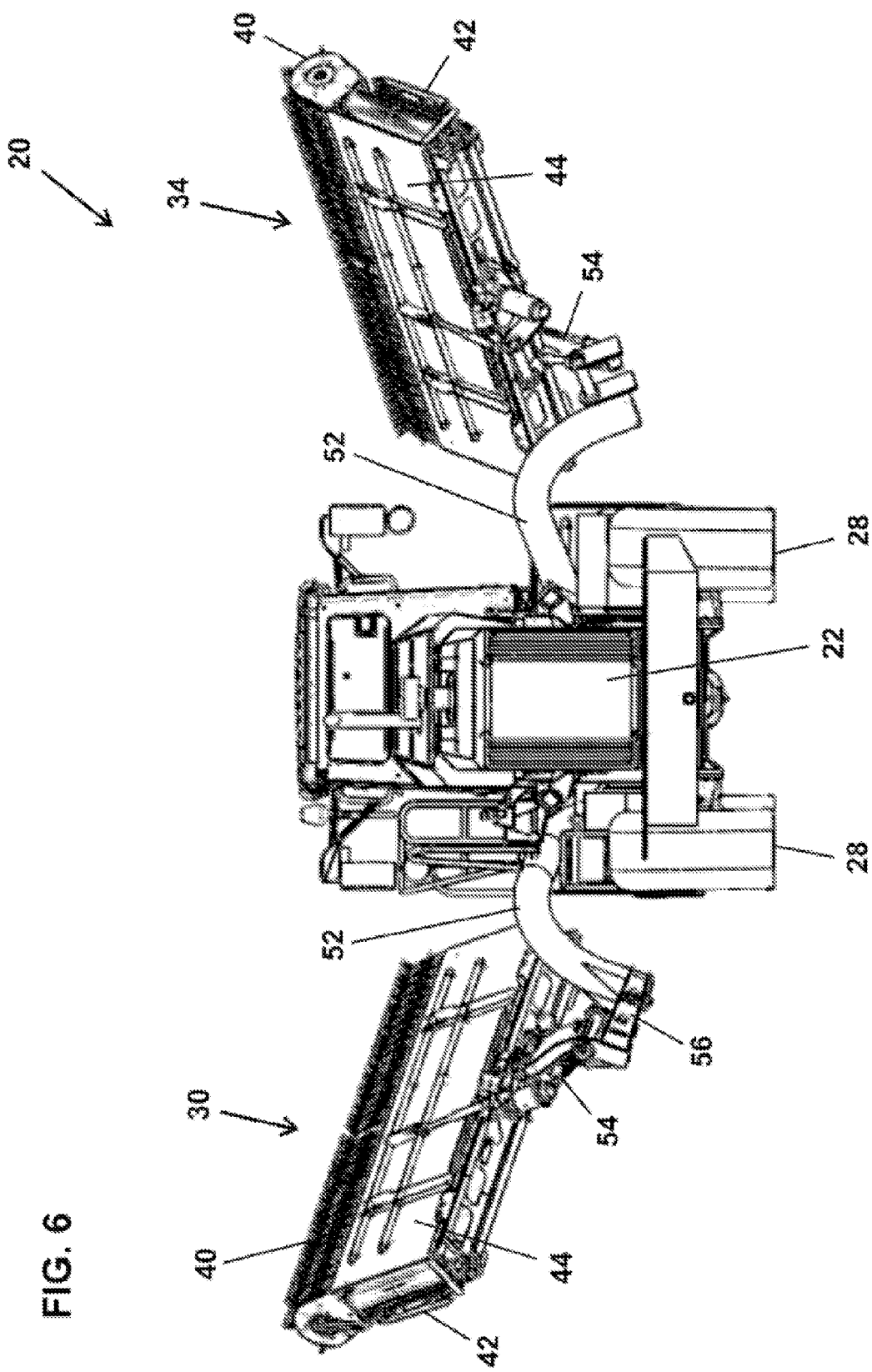
FIG. 6 is a rear elevational view of the self-propelled merger apparatus shown in FIG. 4.

Referring to FIGS. 4-6, the pickup and transfer assemblies may be moved towards a retracted position by first folding the shrouds 44 of the outer assemblies 30 and 34 downward substantially against the conveyors 42. The assemblies 30 and 34 are then much more compact and may be easily moved to a transport position. The arms 52 are then rotated upward and rearward. Each of the assemblies 30 and 34 mounts the arm on pivoting supports 56 as well as the linkages 54 that provide for moving the assemblies 30 and 34 to their use position and to a properly aligned position extending from front to rear in the fully retracted transport position. In the fully retracted position, the assemblies 30 and 34 are rear of the cab 24 to provide an open field of vision to the sides of the operator. Mirrors 76 allow the operator to view around and behind the merger 20 with assemblies positioned on either side of the chassis and aligned to minimize blocking the operator's field of vision. The center assembly 32 lifts upward as explained hereinafter, with the shroud 44 at least partially retracted toward the conveyor 42. It can be appreciated that the arms 52 provide for clearing the tires of the front wheels 26 by the pivot angle and the extension and curvature of the arms 52. Each of the assemblies 30 and 34 are simply rotated relative to the arm 52 to avoid contacting the tires of the wheels 26.

Figure 7:
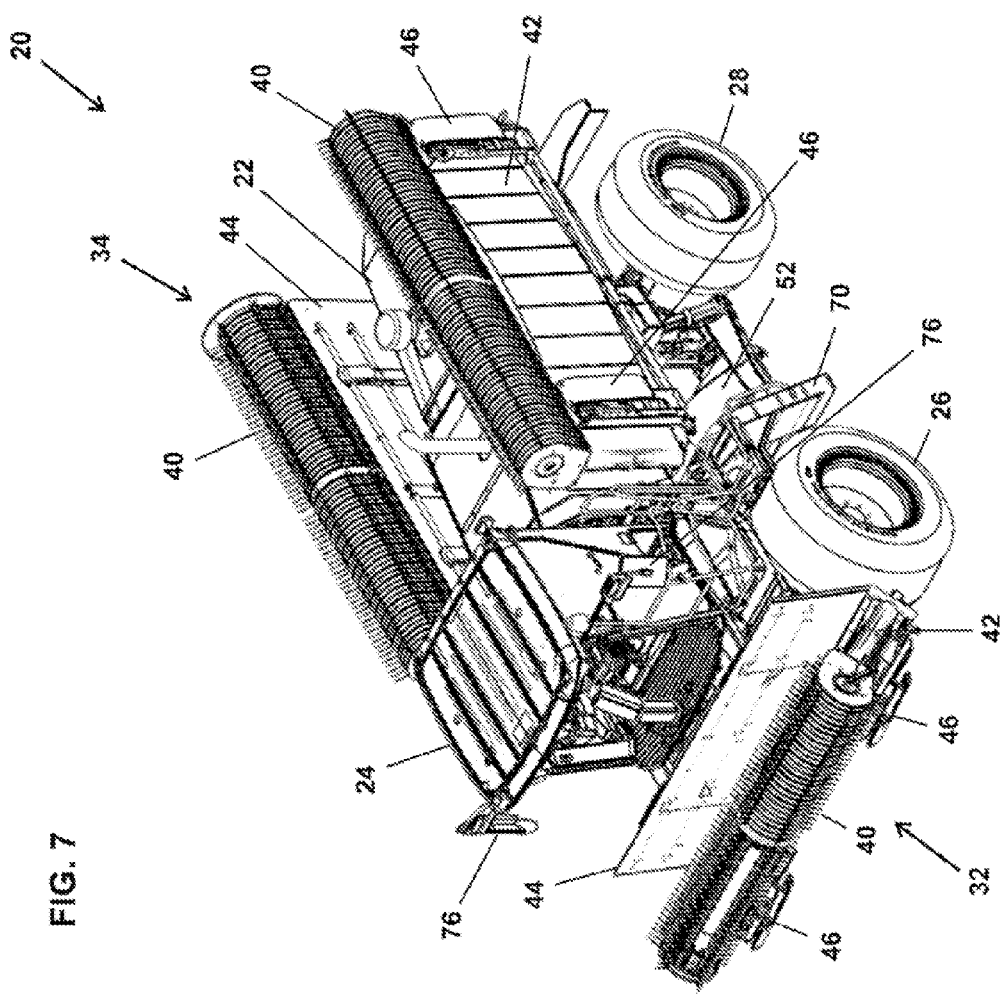
FIG. 7 is a perspective view of the self-propelled merger apparatus shown in FIG. 1 with the head assemblies in a retracted position for transport.
Figure 8:
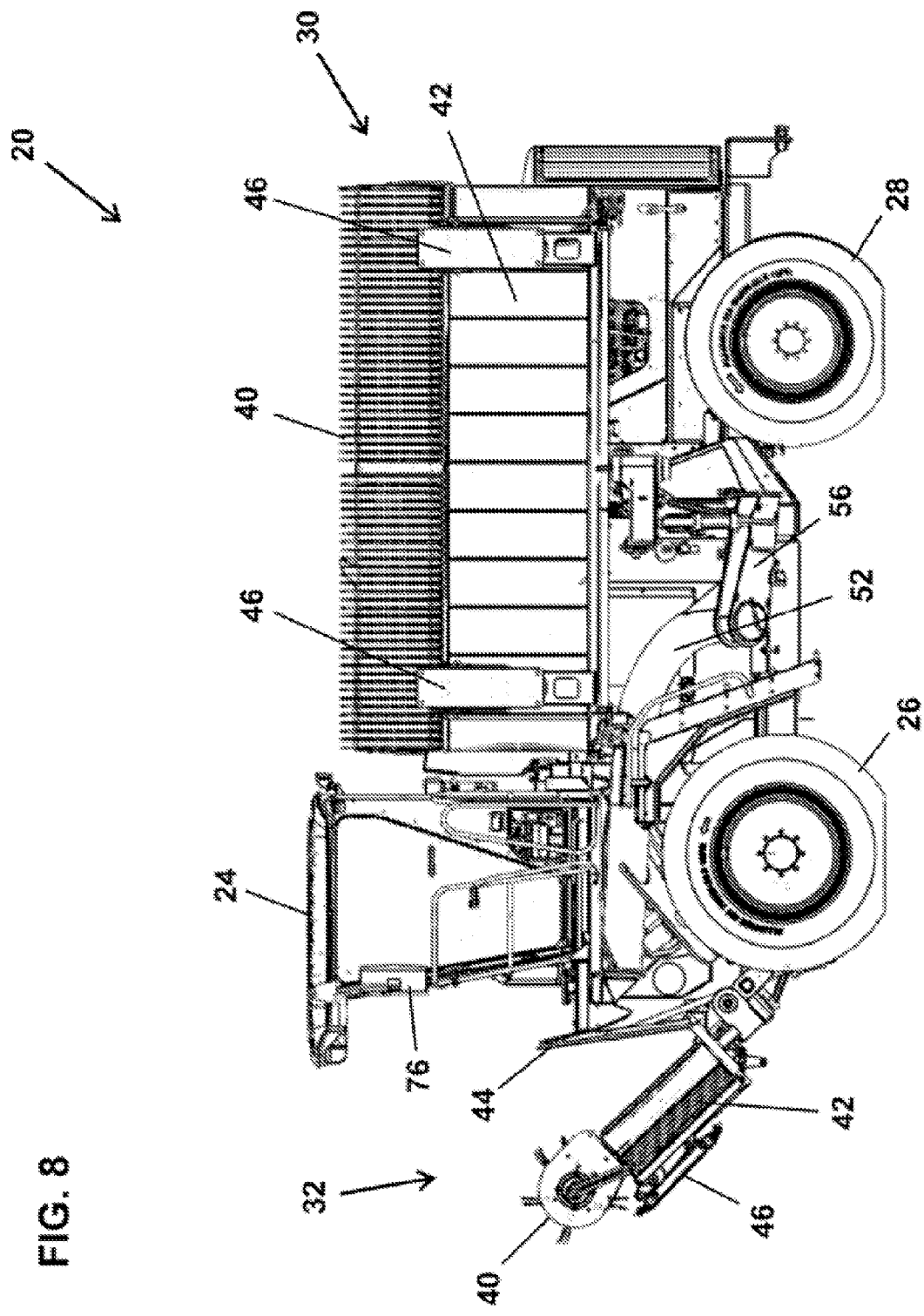
FIG. 8 is a right side perspective view of the self-propelled merger apparatus shown in FIG. 7.
Figure 9:
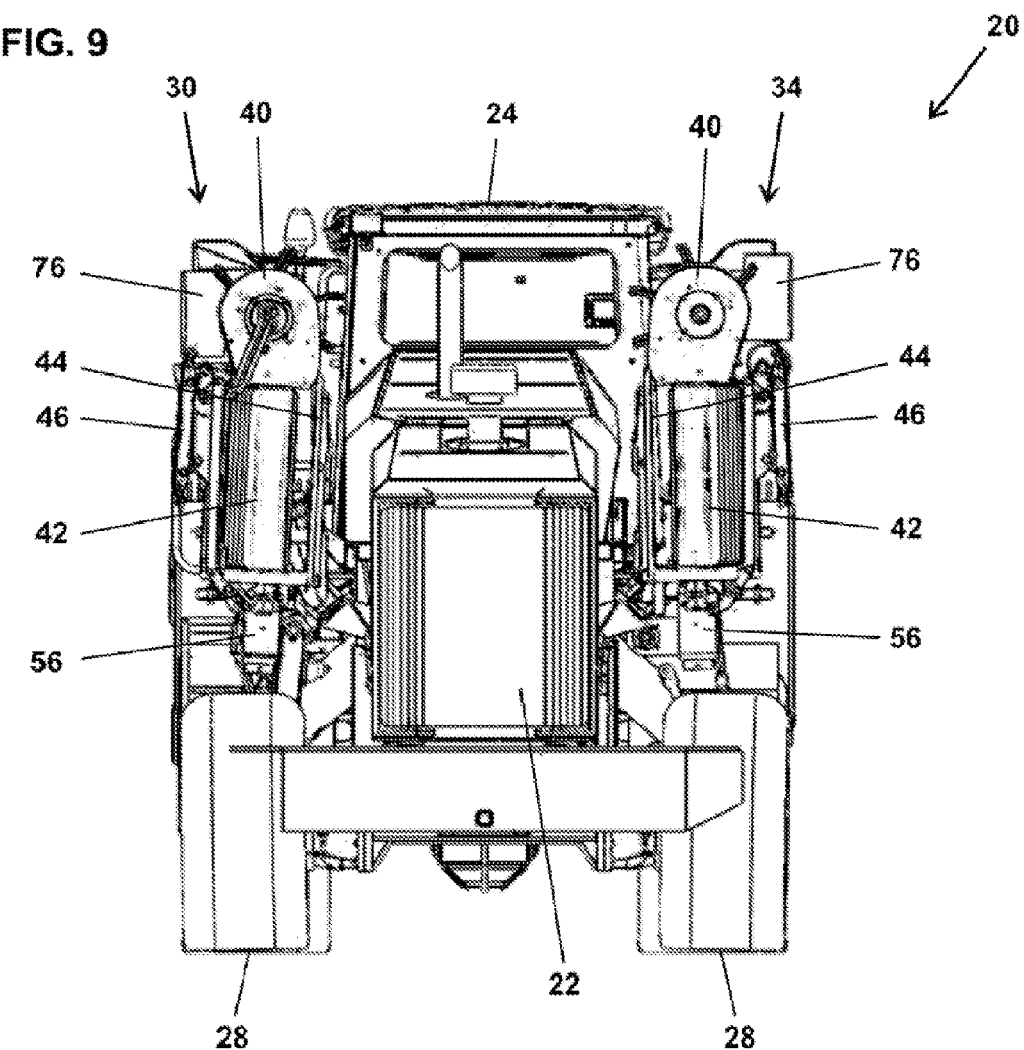
FIG. 9 is a rear elevational view of the self-propelled merger apparatus shown in FIG. 7.

Referring now to FIGS. 7-9, the pickup and transfer assemblies 30, 32 and 34 are in the retracted position for transport. The outer assemblies 30 and 34 are positioned with the conveyors 42 extending horizontally. Therefore, chaff, hay and other materials on the conveyor 42 or in between the conveyor is allowed to fall off and downward. The center assembly 32 is also tilted backward to clear material from the conveyors 42. In the retracted transport position, the outer assemblies 30 and 34 extend along either side of the chassis 22 in a compact configuration. The width of the merger is no wider than the center assembly 32 and the wheels 26 and 28. Moreover, the operator may see directly rearward without the pickup and transfer assemblies 30, 32 and 34 blocking the operator's view. The rearview mirrors 76 extend outward beyond the retracted assemblies 30 and 34 so that the operator may also see rearward and to the sides. The positioning of the assemblies 30 and 34 therefore creates minimal blind spots for the operator.

In addition, the center assembly 34 is lifted upward so as not to block the forward view while also extending a minimal distance forward of the cab 24 and/or the front wheels 26 to make maneuvering easier. This also minimizes the length of the merger 20 for transport on trailers.

Figure 10:
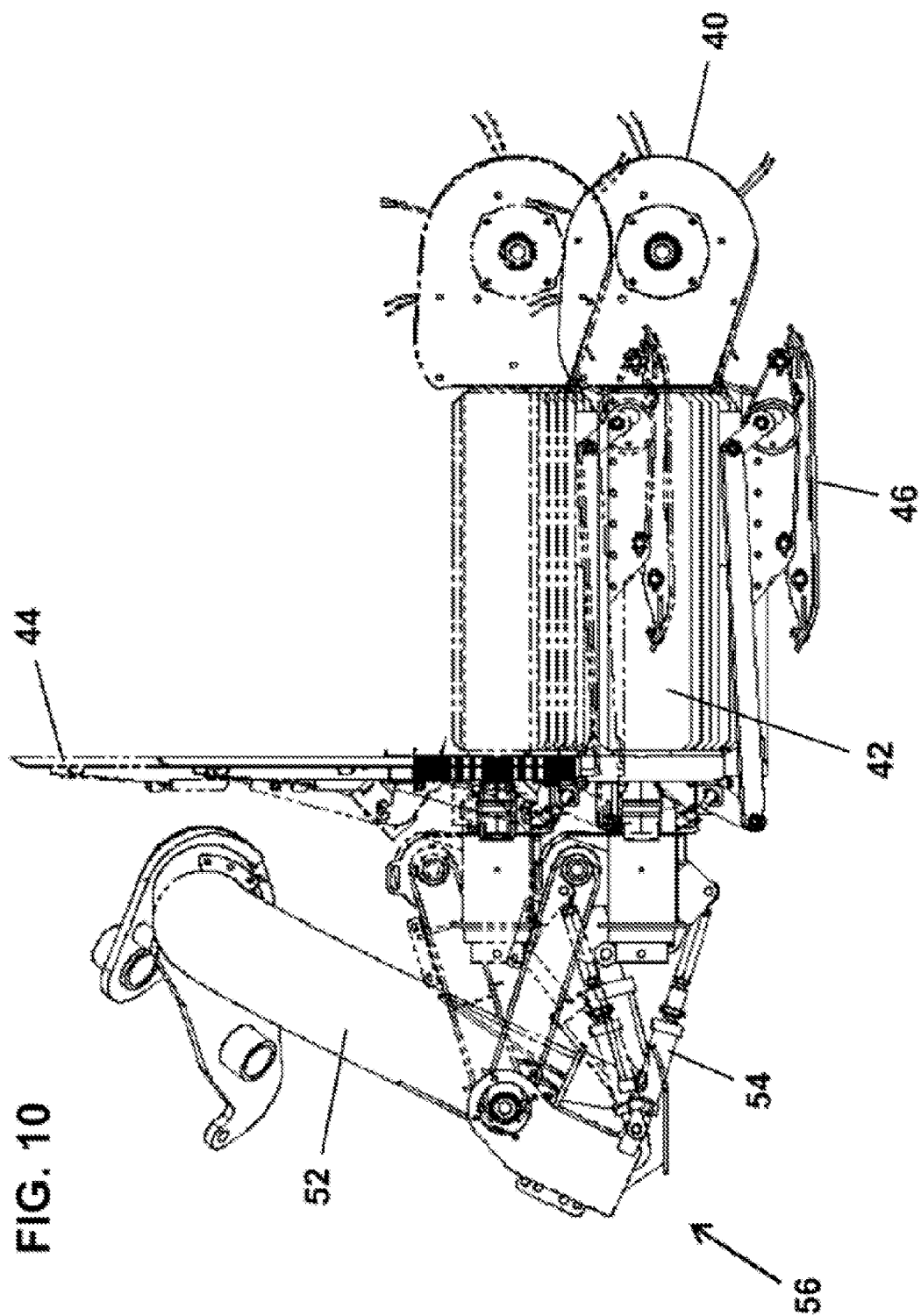
FIG. 10 is a side elevational view of a head assembly for the self-propelled merger shown in FIG. 1 and with the head assembly adjusted to a different height shown in phantom.
Figure 11:
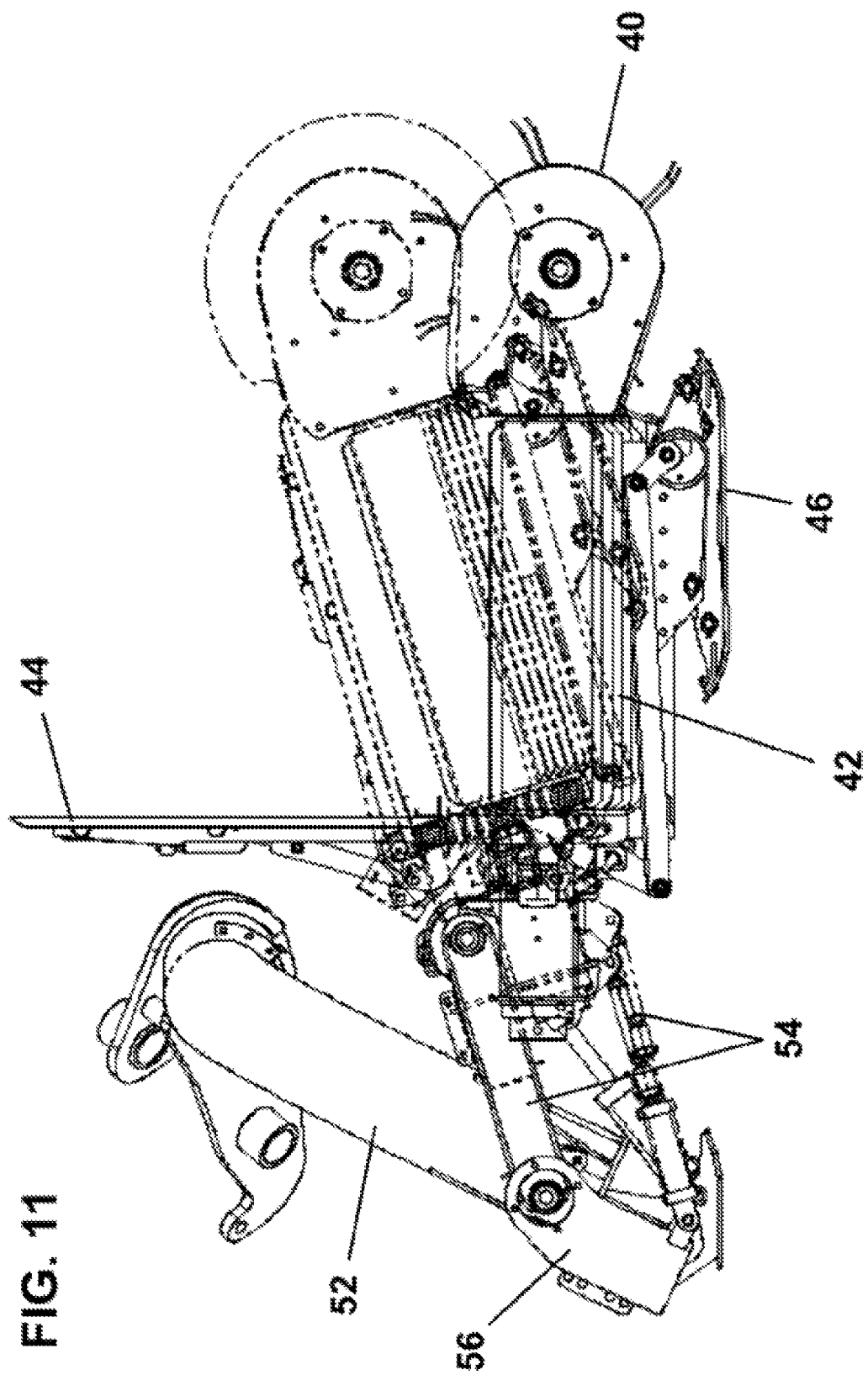
FIG. 11 is a side elevational view of the head assembly shown in FIG. 10 with the head assembly at an angle and with the head assembly adjusted to a different height shown in phantom.

Referring to FIGS. 10 and 11, it can be seen that the configuration of the assemblies as well as the support structure provides not only for easy movement between the use position and retracted transport position but also provides for greater adjustability of the angles of the heads 40 and conveyors 42 for use or transport. The arm 52, support 56 and linkage 54 can be used to both move between the transport and use position and also to provide proper height adjustment over uneven terrain when used with the skids of the float assembly 46. The conveyors 42 and heads may also be angled and placed at various heights, as shown as FIGS. 10 and 11, and as shown in phantom. Moreover, the shrouds 44 may be folded into a position adjacent the upper surface of the conveyors 42 to provide for more compact and aerodynamic transport.

Figure 12:
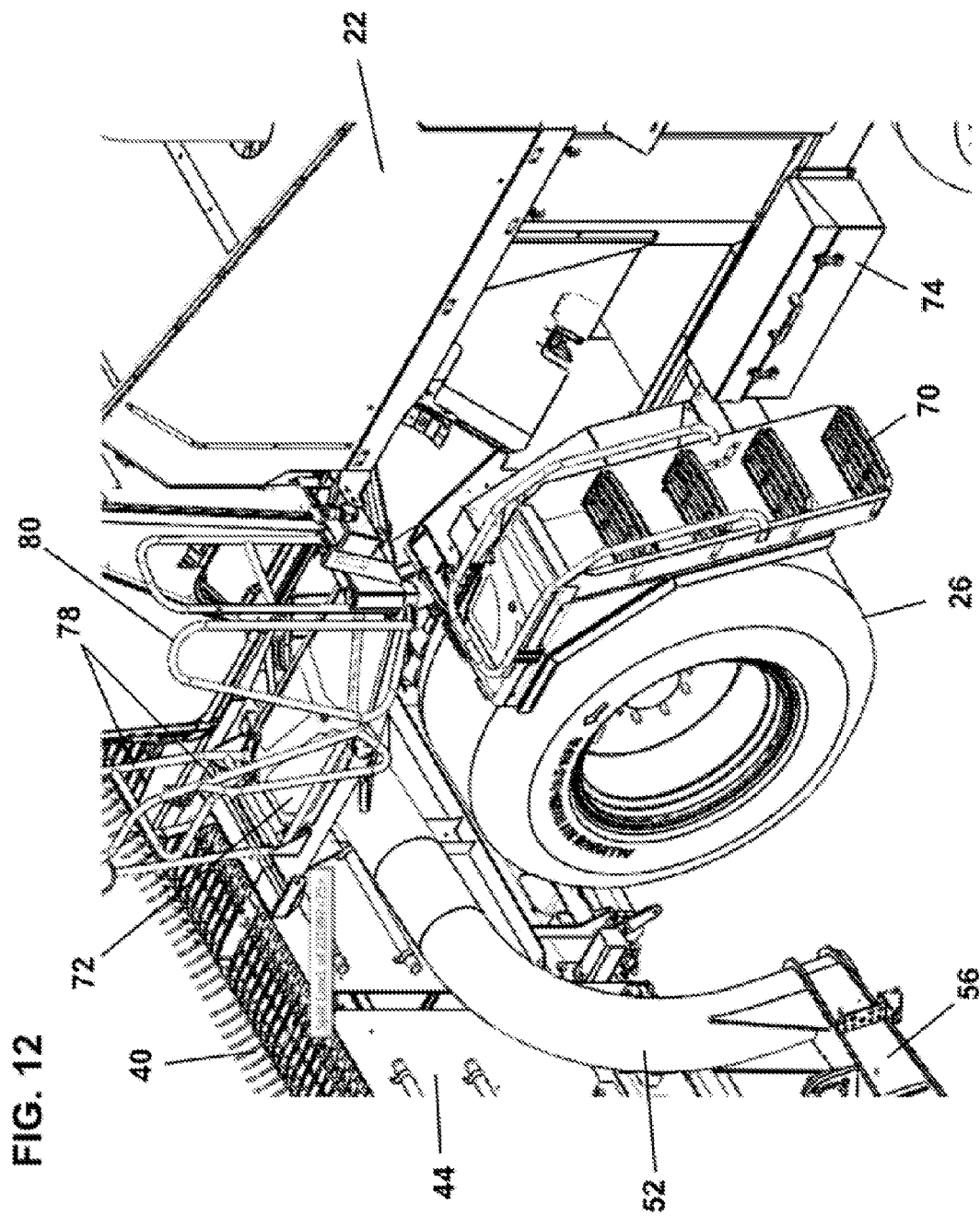
FIG. 12 is a rear perspective view of the ladder behind the front wheel for the self-propelled merger apparatus shown in FIG. 1 with the arm at an intermediate position and the platform lifted.
Figure 13:
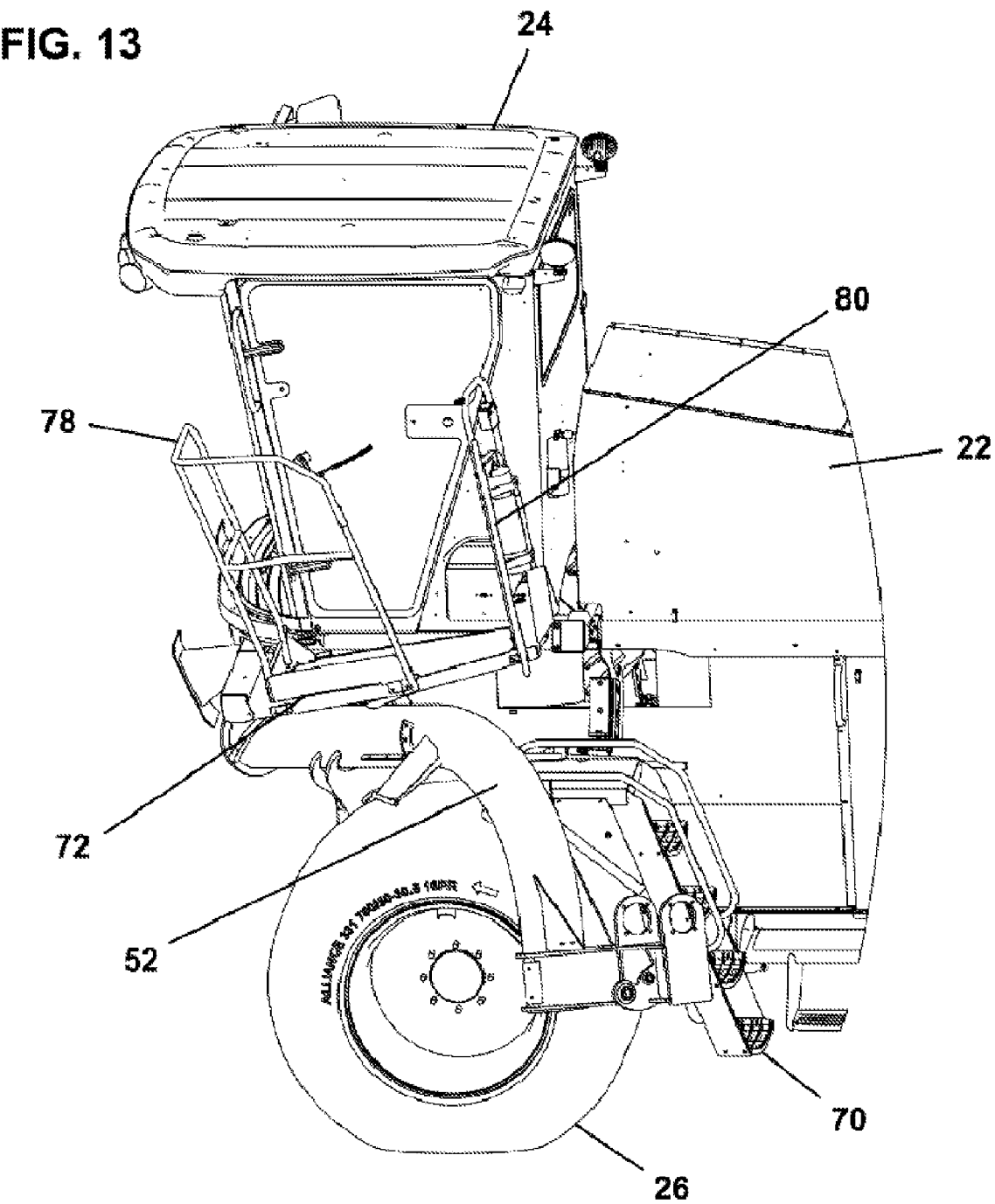
FIG. 13 is a side detail view of the ladder and arm shown in FIG. 12, the head being removed for clarity.
Figure 14:
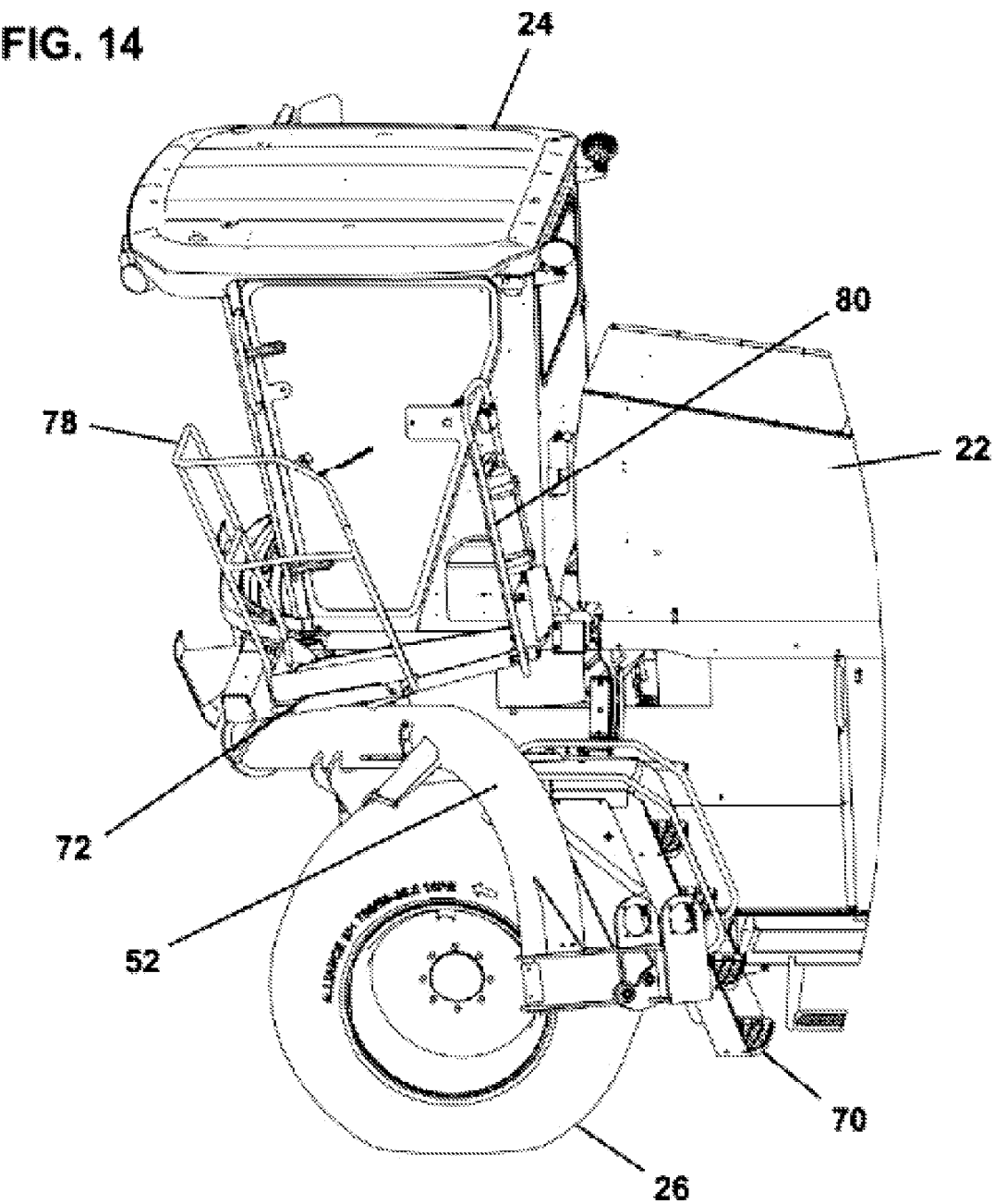
FIG. 14 is a side detail view of the ladder shown in FIG. 12 with the arm in the lowered use position.
Figure 15:
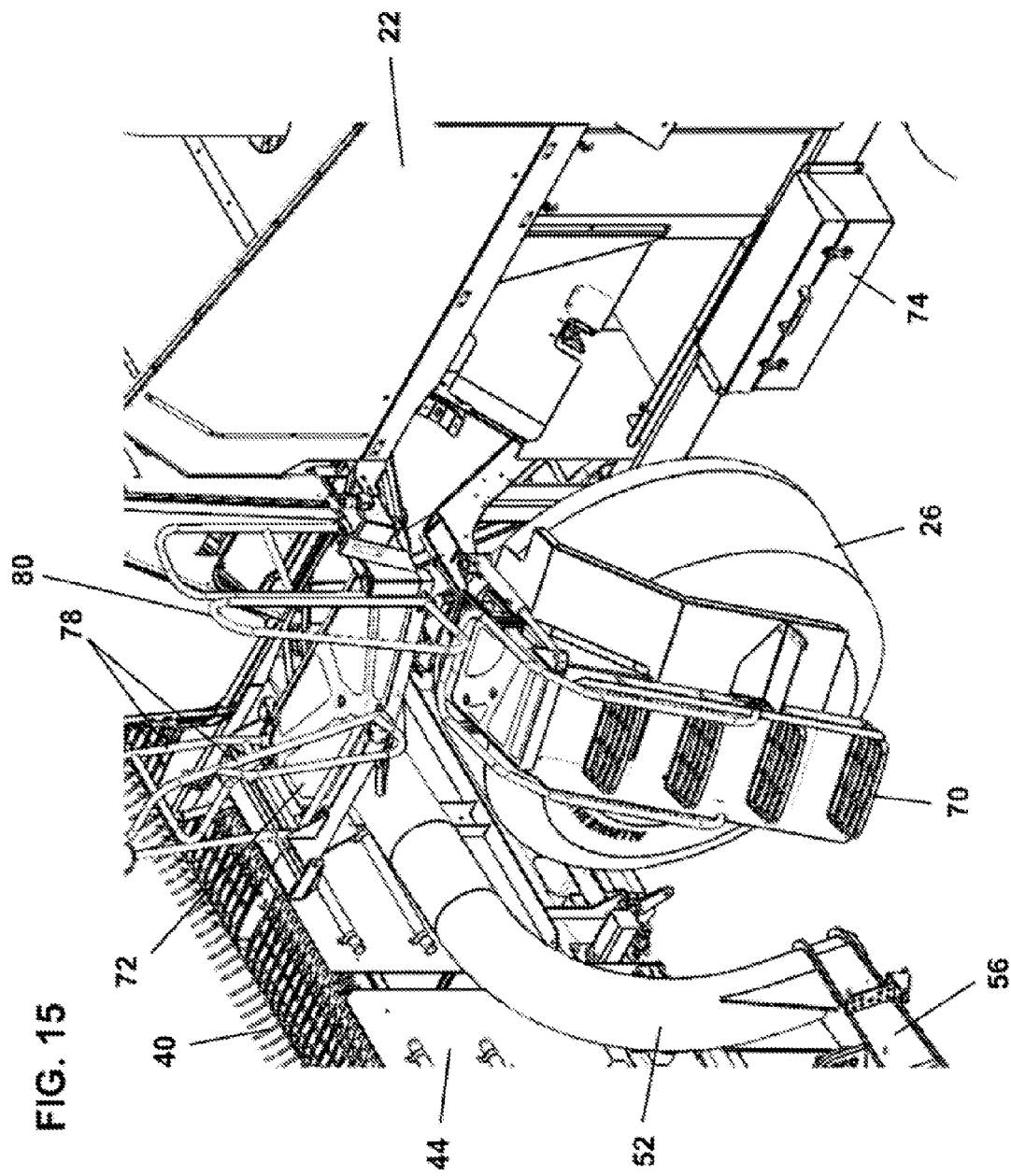
FIG. 15 is a rear perspective view of the ladder shown in FIG. 12 with the ladder extending laterally over the front wheel to allow access to the platform and cab.
Figure 16:
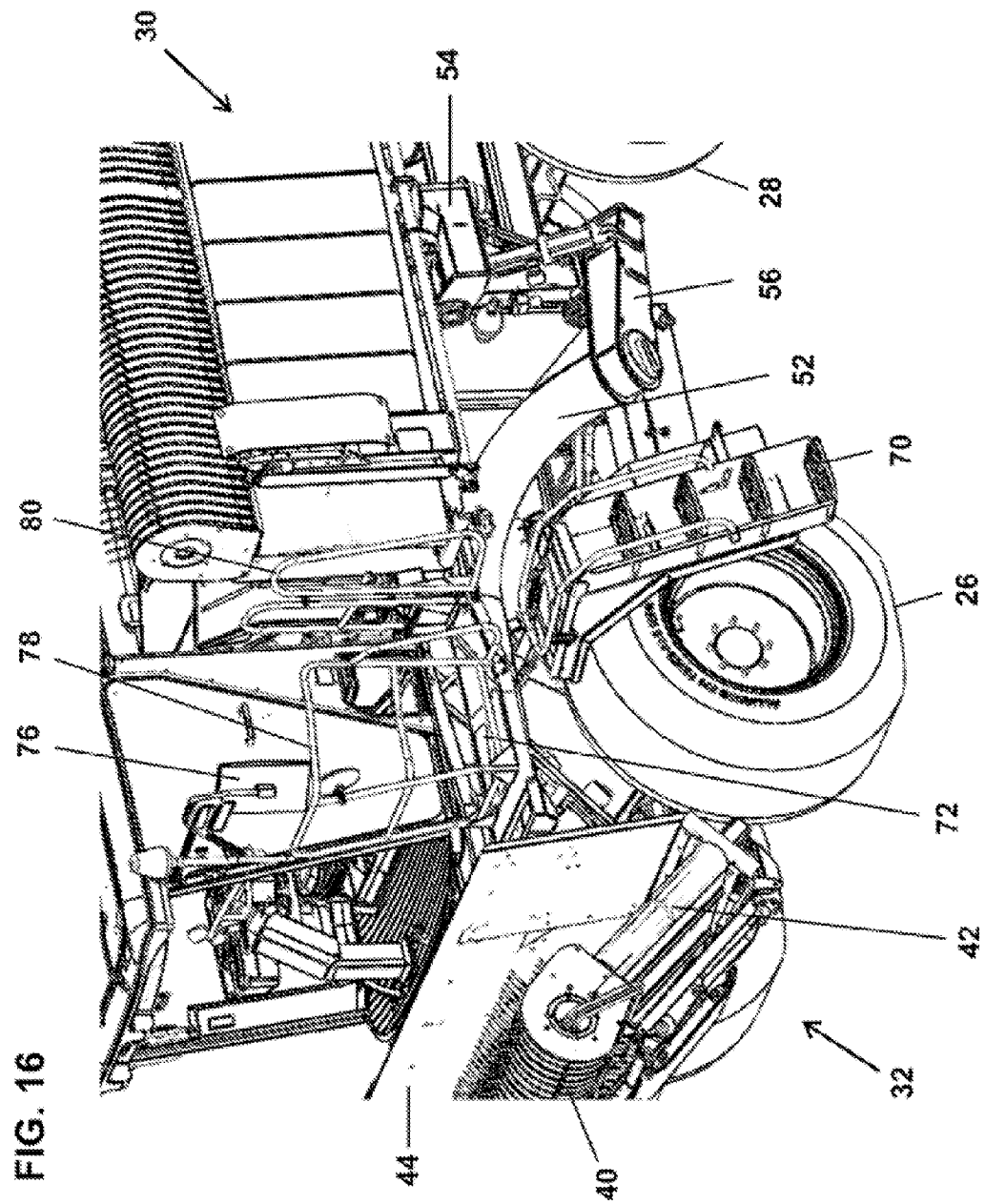
FIG. 16 is a front perspective view of the self-propelled merger apparatus shown in FIG. 1 with ladder of FIG. 12 extending laterally over the front wheel and the head assemblies in a retracted position.
Figure 17:
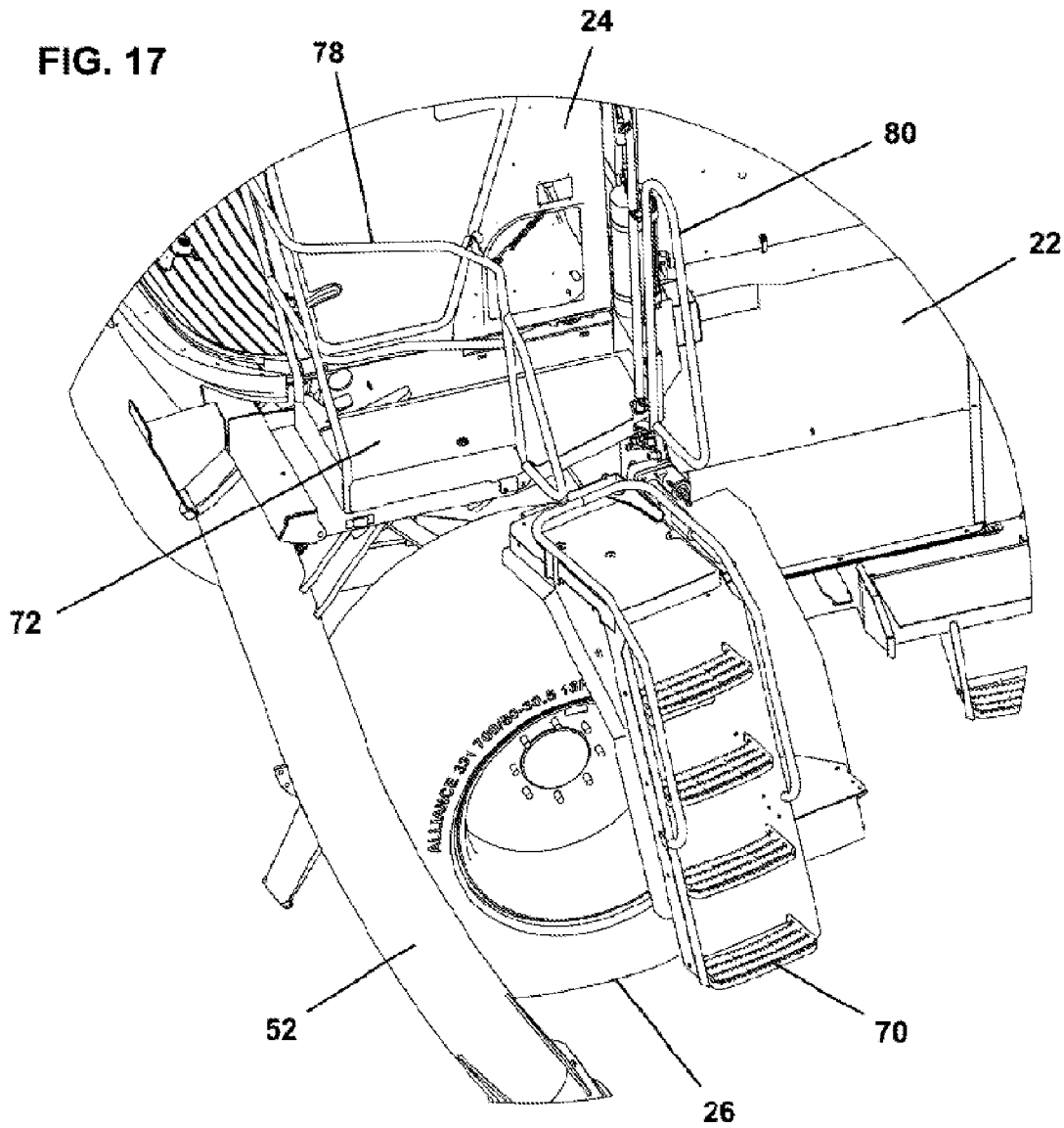
FIG. 17 is a side detail view of the platform and ladder shown in FIG. 12 with the ladder extended laterally over the wheel.
Figure 18:
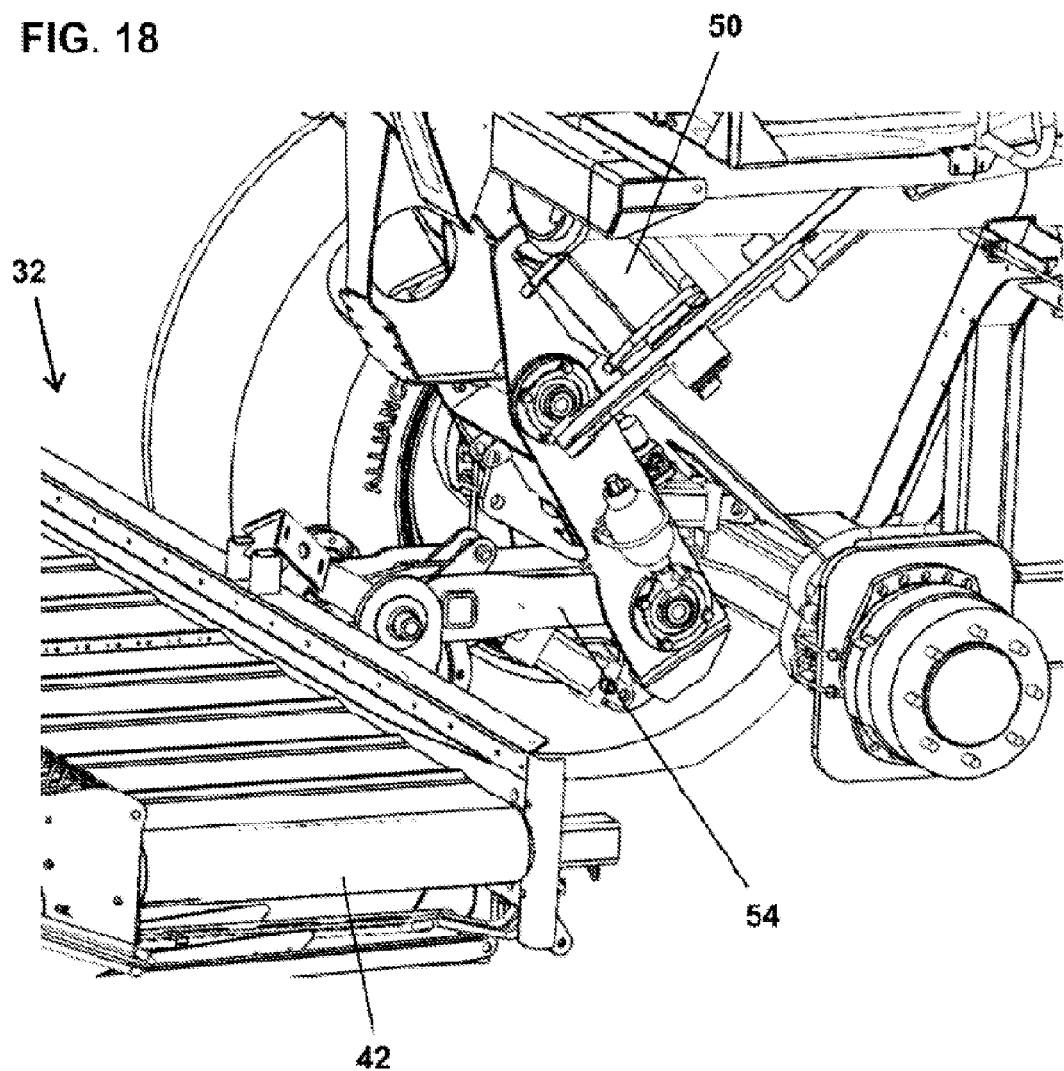
FIG. 18 is a perspective view of the mechanism for moving the center head assembly between an extended position for use and a retracted position for transport, with the head assemblies in an extended position for use and with portions removed for clarity.
Figure 19:
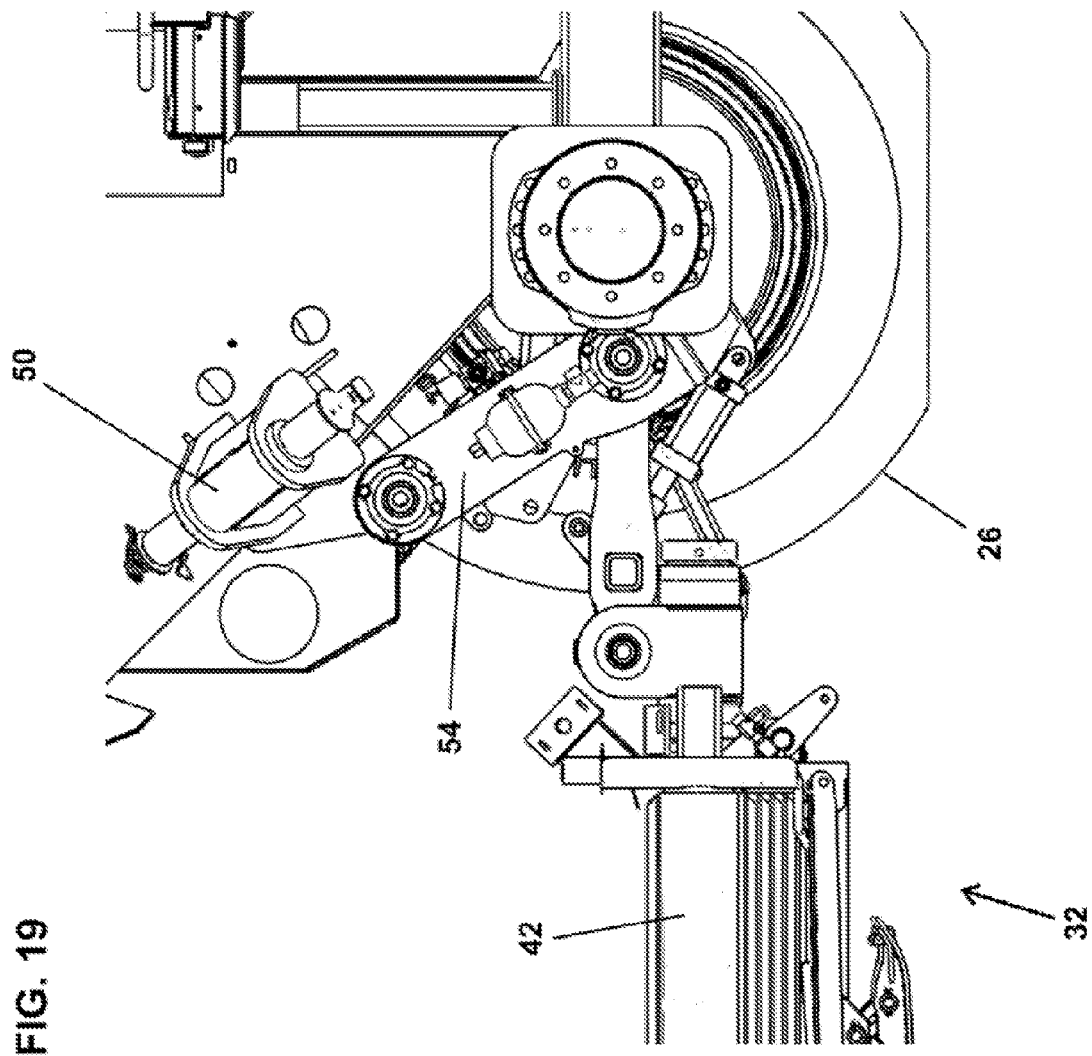
FIG. 19 is a side elevational view of the mechanism for moving the center head assembly shown in FIG. 18.
Figure 20:
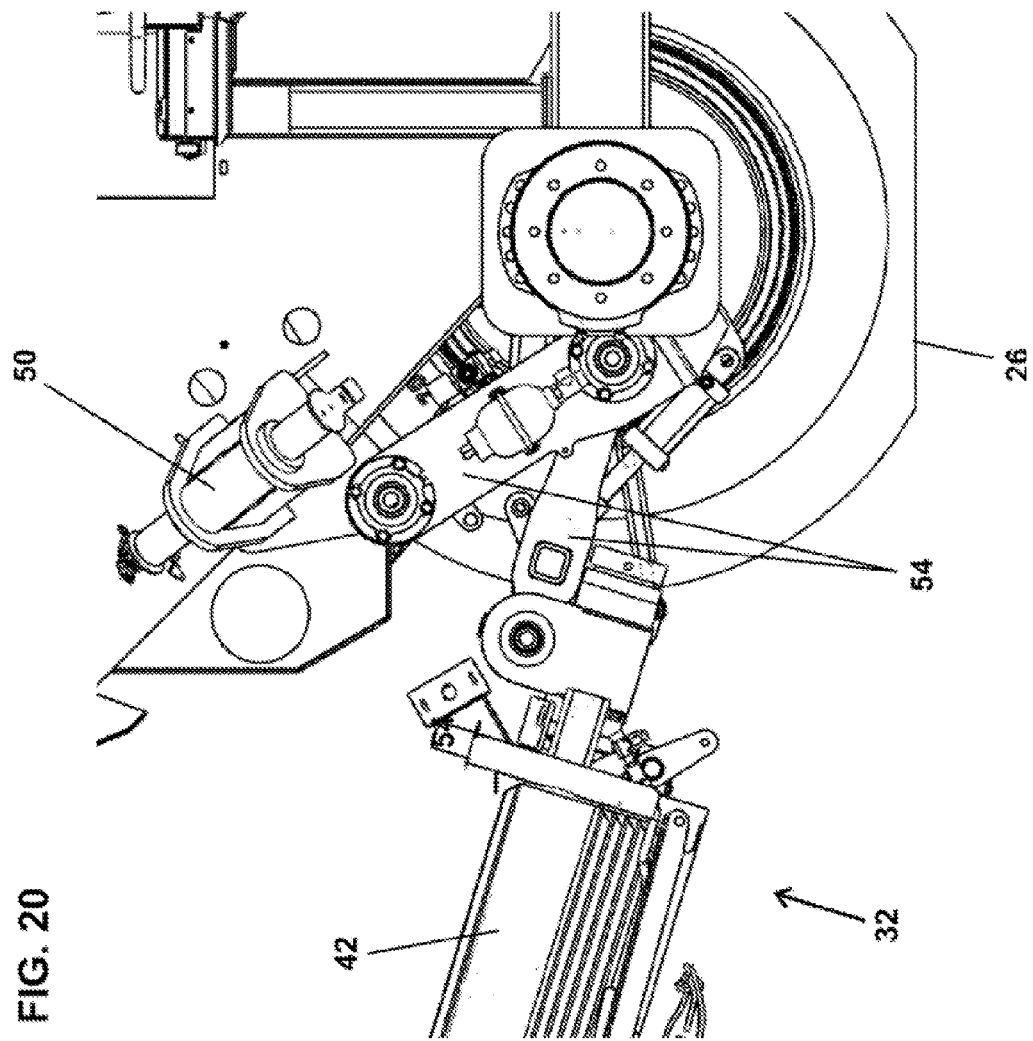
FIG. 20 is an side elevational view of the mechanism for moving the center head assembly shown in FIG. 18 with the head assemblies in an intermediate position.
Figure 21:
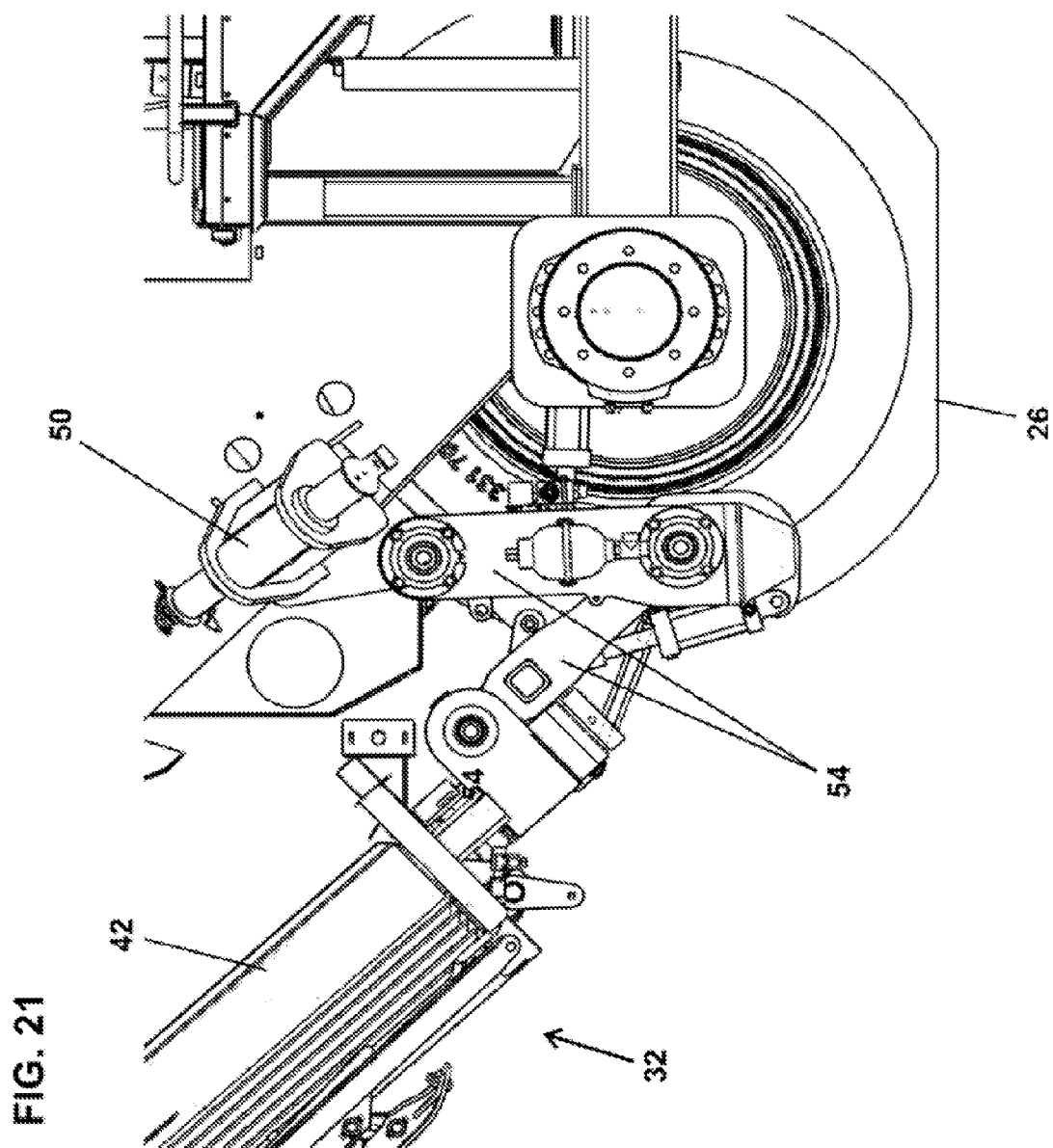
FIG. 21 is a side elevational view of the mechanism for moving the center head assembly shown in FIG. 18 with the head assemblies in a retracted position for transport.

Referring now to FIGS. 12-16, in addition to providing simple and reliable movement of the assemblies 30, 32 and 34, the present invention overcomes issues related to accessing the cab 24. As shown in FIG. 12, a ladder 70 and platform 72 are utilized for providing access for the operator to reach the door to the cab 24. Platform guard rails 78 provide added safety when standing on the platform 72 and provide an access opening aligned with the ladder 70 when positioned as shown in FIGS. 13-17. To provide clearance for moving the assembly 30, the ladder 70 is positioned to extend rearward and behind the front wheel 26, as shown in FIG. 12. The platform 72 is lifted up to allow the arm 52 to pass beneath the platform while the arm 52 moves between the use position and the travel position. A folding section 80 is also moved to allow the arm 52 and assembly 30 to be moved rearward to provide a path without striking the ladder 70, the rail 78, the platform 72 or the front wheel 26. As shown in FIGS. 12-14, when the ladder is retracted, the folding rail section 80 also acts as a barrier across the opening access opening to the ladder 70 when the ladder 70 is extended. When access is required, the ladder 70 is moved to extend laterally outward beyond the leftmost front wheel 26, as shown in FIGS. 15-17. A section of the hand rail 78 is also extended outward to provide a hand hold for the operator when ascending or descending the ladder and entering or leaving the cab 24. The ladder 70 and folding rail section 80 may be tied to movement of the pickup and transfer assemblies so that they automatically retract out of the way of the arm 52 and/or are locked in a position to allow the arm 52 move between the use position and the travel position.

Referring now to FIGS. 18-21, the folding mechanism for the center assembly 32 is shown. The pivot linkage 54 provides for retracting the center assembly 32 from the use position shown in FIGS. 18 and 19 to the transport position shown in FIG. 21, and varying the height and angle of the center assembly 32.

In addition, the pivot pin 50 for the arm 52 (removed for clarity) is shown. It can be appreciated that the pivot pin 50 is oriented to project inward and upward to facilitate the correct pivoting path for the arms 52. By orienting the pivot pin 50 as shown, a more complicated multi-arm linkage is avoided. The orientation of the mounting pin 50 combines with the shape of the arms 52 to facilitate a simple pivoting motion with the arms 52 rotating about a single pivot axis without folding to move the assemblies 30 and 34 between the use and retracted positions. Each of the pin 50s is oriented with an upper end projecting rearward and inward. This orientation creates an axis that allows the arms 52 to swing over the left front wheel 26 and below the platform 72 between the use position and the retracted position for transport. The assemblies 30 and 34 pivot about support members 56 and with linkages 58 that are also used for the float to achieve the preferred positioning for both use and for retraction to a transport position.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A self-propelled merger configured for travel in a first direction; the merger comprising:
   a motor;
   front wheels and rear wheels;
   a chassis;
   a first merger pickup and transfer assembly, the first merger pickup and transfer assembly including a first pickup head configured to pick up and transfer material to an associated first belt conveyor arranged to convey material in a direction transverse to the first direction of travel and driven by a first motor;

a second merger pickup and transfer assembly the second merger pickup and transfer assembly including a second pickup head configured to pick up and transfer material to an associated second belt conveyor arranged to convey material in a direction transverse to the first direction of travel and driven by a second motor; and a third merger pickup and transfer assembly, the third merger pickup and transfer assembly including a third pickup head configured to pick up and transfer material to an associated third belt conveyor arranged to convey material in a direction transverse to the first direction of travel and driven by a third motor;

each of the merger pickup and transfer assemblies being movable between a first position wherein the merger pickup and transfer assemblies are laterally aligned, and a second position;

a cab extending above and behind the second merger pickup and transfer assembly; the first merger pickup and transfer assembly, the second merger pickup and transfer assembly and the third merger pickup and transfer assembly being forward of the cab and the front wheels in the first position, and the first merger pickup and transfer assembly and the third merger pickup and transfer assembly being rear of the cab in the second position;

a folding mechanism for moving each of the merger pickup and transfer assemblies between the first position and the second position;

wherein each of the first and third merger pickup and transfer assemblies is supported on an associated arm mounted to the chassis, the associated arm rotationally mounted forward of the front wheels to move each of the first and third merger pickup and transfer assemblies between the first position forward of the cab and the front wheels, and the second position rear of the cab.

2. A self-propelled merger according to claim 1, each of the merger pickup and transfer assemblies comprising a merger pickup head, a conveyor and a shroud.

3. A self-propelled merger according to claim 2, wherein at the second position, the chassis is intermediate the first merger pickup and transfer assembly and the third merger pickup and transfer assembly.

4. A self-propelled merger according to claim 3, wherein the first merger pickup and transfer assembly and the third merger pickup and transfer assembly extend substantially along the first direction of travel at the second position.

5. A self-propelled merger according to claim 2, wherein the first and third merger pickup and transfer assemblies are oriented with surfaces of the conveyors facing horizontally at the second position.

6. A self-propelled merger according to claim 1, wherein each of the arms supporting the first and third merger pickup and transfer assemblies rotates about a single axis about a pin on the chassis, wherein the pin extends inward and upward.

7. A self-propelled merger according to claim 3, wherein the second merger pickup and transfer assembly is tiltably mounted to tilt upward at the second position for transport.

8. A self-propelled merger according to claim 1, further comprising a platform extending laterally outward from the first side of the cab.

9. A self-propelled merger according to claim 2, wherein the merger pickup head of each of the first and third merger pickup and transfer assemblies is rear of the cab in the second position, and wherein the second merger pickup and transfer assembly is forward of the cab in the second position.

10. A self-propelled merger configured to move along a direction of travel, the merger comprising:

a motor;

front wheels and rear wheels;

a chassis;

a first pickup and transfer assembly, the first pickup and transfer assembly including a first pickup head configured to pick up and transfer material to an associated first belt conveyor arranged to convey material in a direction transverse to the direction of travel and driven by a first motor;

a second pickup and transfer assembly, the second pickup and transfer assembly including a second pickup head configured to pick up and transfer material to an associated second belt conveyor arranged to convey material in a direction transverse to the direction of travel and driven by a second motor; and a third pickup and transfer assembly, the third pickup and transfer assembly including a third pickup head configured to pick up and transfer material to an associated third belt conveyor arranged to convey material in a direction transverse to the direction of travel and driven by a third motor;

each of the pickup and transfer assemblies comprising a shroud and being movable between a first position wherein the pickup and transfer assemblies are laterally aligned and a second position, wherein each of the first and third pickup and transfer assemblies is supported on an associated arm mounted to the chassis;

a cab extending above and behind the second pickup and transfer assembly; the first pickup and transfer assembly, the second pickup and transfer assembly and the third pickup and transfer assembly being forward of the cab and the front wheels in the first position;

a folding mechanism for moving each of the pickup and transfer assemblies between the first position and the second position;

a platform extending laterally outward from the first side of the cab;

wherein the arm of the first pickup and transfer assembly is rotationally mounted forward of the front wheels and bends to pass directly under the platform and pass directly over the front wheel at the first side when moving between the first and second positions.

11. A self-propelled merger comprising:

a motor;

front wheels and rear wheels;

a chassis;

a first merger pickup and transfer assembly, a second merger pickup and transfer assembly and a third merger pickup and transfer assembly, each of the merger pickup and transfer assemblies being movable between a first position wherein the merger pickup and transfer assemblies are laterally aligned, and a second position;

a cab extending above and behind the second merger pickup and transfer assembly; the first merger pickup and transfer assembly, the second merger pickup and transfer assembly and the third merger pickup and transfer assembly being forward of the cab and the front wheels in the first position, and the first merger pickup and transfer assembly and the third merger pickup and transfer assembly being rear of the cab in the second position;

a folding mechanism for moving each of the merger pickup and transfer assemblies between the first position and the second position;

wherein each of the first and third merger pickup and transfer assemblies is supported on an associated arm mounted to the chassis, the associated arm rotationally mounted forward of the front wheels to move each of the first and third merger pickup and transfer assemblies between the first position forward of the cab and the front wheels, and the second position rear of the cab;

a platform extending laterally outward from the first side of the cab, wherein the platform comprises a railing having a foldable section configured to fold during movement of the first pickup and transfer assembly.

12. A self-propelled merger according to claim 11, wherein the section of the railing forms a barrier to prevent access to the ladder during movement of the first pickup and transfer assembly.

13. A self-propelled merger moving along a direction of travel, the merger comprising:
a motor;
a chassis;
front wheels and rear wheels supporting the chassis;
a first pickup and transfer assembly, the first pickup and transfer assembly including a first pickup head configured to pick up and transfer material to an associated first belt conveyor arranged to convey material in a direction transverse to the direction of travel and driven by a first motor;
a second pickup and transfer assembly, the second pickup and transfer assembly including a second pickup head configured to pick up and transfer material to an associated second belt conveyor arranged to convey material in a direction transverse to the direction of travel and driven by a second motor; and
a third pickup and transfer assembly, the third pickup and transfer assembly including a third pickup head configured to pick up and transfer material to an associated third belt conveyor arranged to convey material in a direction transverse to the direction of travel and driven by a third motor;
a cab above and behind the second pickup and transfer assembly;
a folding mechanism for moving each of the pickup and transfer assemblies between a first position wherein the first, second and third pickup and transfer assemblies are laterally aligned and forward of the cab and the front wheels; and a second position wherein the first and third pickup and transfer assemblies are rear of the cab;
the folding mechanism comprising a first arm mounted to the chassis and supporting the first pickup and transfer assembly, and a second arm mounted to the chassis and supporting the third pickup and transfer assembly, the first and second arms rotatably mounting to the chassis and the first pickup and transfer assembly rotatably mounting to the first arm and the third pickup and transfer assembly rotatably mounting to the second arm, the first arm and the second arm being rotatably mounted about an oblique axis relative to the direction of travel.

14. A self-propelled merger according to claim 13, each of the pickup and transfer assemblies comprising a pickup head, a conveyor and a shroud.

15. A self-propelled merger according to claim 13, wherein each of the first and second arms pass directly over a front wheel when rotating between the first position and the second position.

16. A self-propelled merger comprising:
a motor;
front wheels and rear wheels;
a chassis;
a cab;
a first pickup and transfer assembly, the first pickup and transfer assembly including a first pickup head configured to pick up and transfer material to an associated first belt conveyor arranged to convey material in a direction transverse to the direction of travel and driven by a first motor;
a second pickup and transfer assembly, the second pickup and transfer assembly including a second pickup head configured to pick up and transfer material to an associated second belt conveyor arranged to convey material in a direction transverse to the direction of travel and driven by a second motor; and
a third pickup and transfer assembly, the third pickup and transfer assembly including a third pickup head configured to pick up and transfer material to an associated third belt conveyor arranged to convey material in a direction transverse to the direction of travel and driven by a third motor;
each of the merger pickup and transfer assemblies being movable between a first position wherein the pickup and transfer assemblies are laterally aligned below and forward of the cab and the front wheels, and a second raised position; wherein the first and third merger pickup assemblies are behind the cab in the second raised position;
a folding mechanism for moving each of the pickup and transfer assemblies between the first position and the second position;
wherein each of the first and third merger pickup and transfer assemblies is supported on an associated arm mounted to the chassis forward of the front wheels, each of the arms supporting the first and third merger pickup and transfer assemblies being rotatably mounted on a pin on the chassis to rotate about a single axis, wherein the pin extends inward and upward.

17. A self-propelled merger according to claim 16, wherein each of the first and third pickup and transfer assemblies is supported on an associated arm mounted to the chassis and extending substantially horizontally and bending downward in the first position.

18. A self-propelled merger comprising:
a motor;
front wheels and rear wheels;
a chassis;
a first pickup and transfer assembly, the first pickup and transfer assembly including a first pickup head configured to pick up and transfer material to an associated first belt conveyor arranged to convey material in a direction transverse to the direction of travel and driven by a first motor;
a second pickup and transfer assembly, the second pickup and transfer assembly including a second pickup head configured to pick up and transfer material to an associated second belt conveyor arranged to convey material in a direction transverse to the direction of travel and driven by a second motor; and
a third pickup and transfer assembly, the third pickup and transfer assembly including a third pickup head configured to pick up and transfer material to an associated third belt conveyor arranged to convey material in a direction transverse to the direction of travel and driven by a third motor;

each of the pickup and transfer assemblies comprising a shroud and being movable between a first position wherein the pickup and transfer assemblies are laterally aligned and a second position, a cab extending above and behind the second pickup and transfer assembly; the first pickup and transfer assembly, the second pickup and transfer assembly and the third pickup and transfer assembly being forward of the cab and the front wheels in the first position;

a folding mechanism for each of the pickup and transfer assemblies moving the pickup and transfer assemblies between the first position and the second position; wherein the folding mechanism for each of the first and third pickup and transfer assemblies includes an arm mounted to the chassis forward of the front wheels and supporting an associated one of the first and third pickup and transfer assemblies;

wherein the arm associated with the first pickup and transfer assembly passes directly over the front wheel at a first side of the merger when moving between the first and second positions and the arm associated with the third pickup and transfer assembly passes directly over the front wheel at a second side of the merger when moving between the first and second positions.

* * * * *

UNITED STATES PATENT AND TRADEMARK OFFICE
CERTIFICATE OF CORRECTION

PATENT NO. : 8,919,088 B2  Page 1 of 1
APPLICATION NO. : 13/342820
DATED : December 30, 2014
INVENTOR(S) : Paul W. Dow et al.

It is certified that error appears in the above-identified patent and that said Letters Patent is hereby corrected as shown below:

On the title page item 57 in the Abstract, line 6, please delete "for moves" and insert --moves--.

Signed and Sealed this
Twenty-second Day of March, 2016

Michelle K. Lee
*Director of the United States Patent and Trademark Office*